United States Patent
Fraser

(10) Patent No.: US 12,109,489 B2
(45) Date of Patent: Oct. 8, 2024

(54) SELECTING A CONNECTION IN A NETWORK

(71) Applicant: Netduma Software LTD, London (GB)

(72) Inventor: Iain Kibet Fraser, Cambridge (GB)

( * ) Notice: Subject to any disclaimer, the term of this patent is extended or adjusted under 35 U.S.C. 154(b) by 396 days.

(21) Appl. No.: 17/700,477

(22) Filed: Mar. 21, 2022

(65) Prior Publication Data

US 2022/0212099 A1 Jul. 7, 2022

Related U.S. Application Data

(63) Continuation-in-part of application No. 16/726,713, filed on Dec. 24, 2019, now Pat. No. 11,278,798, which is a continuation-in-part of application No. 15/168,213, filed on May 30, 2016, now Pat. No. 10,581,746.

(60) Provisional application No. 62/197,399, filed on Jul. 27, 2015, provisional application No. 62/168,461, filed on May 29, 2015.

(51) Int. Cl.
*A63F 13/352* (2014.01)
*A63F 13/335* (2014.01)
*H04L 67/146* (2022.01)

(52) U.S. Cl.
CPC .......... *A63F 13/352* (2014.09); *A63F 13/335* (2014.09); *H04L 67/146* (2013.01); *A63F 2300/531* (2013.01); *A63F 2300/534* (2013.01)

(58) Field of Classification Search
CPC .. H04L 67/146; H04L 67/61; A63F 2300/531; A63F 2300/534; A63F 13/358
See application file for complete search history.

(56) References Cited

U.S. PATENT DOCUMENTS

| | | |
|---|---|---|
| 7,236,459 B1 | 6/2007 | Okholm et al. |
| 8,966,457 B2 | 2/2015 | Ebcioglu et al. |
| 10,581,746 B2 | 3/2020 | Fraser |
| 10,715,442 B2 | 7/2020 | Fraser |
| 10,986,030 B2 | 4/2021 | Fraser |
| 11,278,798 B2 | 3/2022 | Fraser |
| 11,570,117 B2 | 1/2023 | Fraser |
| 2005/0083840 A1 | 4/2005 | Wilson |
| 2005/0286522 A1 | 12/2005 | Paddon |
| 2008/0112320 A1 | 5/2008 | van Willigenburg |
| 2010/0002700 A1 | 1/2010 | Simpson, Jr. |
| 2010/0246602 A1 | 9/2010 | Barreto et al. |

(Continued)

OTHER PUBLICATIONS

Author: Jacobson, Guy, Title: "Space-efficient Static Trees and Graphs" 30th Annual Symposium on Foundations of Computer Science, 1989 IEEE, pp. 549-554.

*Primary Examiner* — Kyaw Z Soe

(57) ABSTRACT

A machine, such as a router (or other network appliance capable of filtering incoming packets), determines whether a packet is from a location that is likely to be capable of establishing an acceptable connection quality. If it is determined that an acceptable connection quality is unlikely to be obtained, the machine blocks the packet so that the connection is not established. If it is determined that the acceptable connection quality is likely to be obtained, the packet is received, and the connection is allowed. As a consequence of blocking packets from locations that are expected to have a poor connection, connections are not established with servers that will provide poor service and a poor user experience.

33 Claims, 22 Drawing Sheets

(56) References Cited

U.S. PATENT DOCUMENTS

| | | |
|---|---|---|
| 2011/0019555 A1 | 1/2011 | Gotoh et al. |
| 2013/0090115 A1* | 4/2013 | Deivasigamani ..... H04W 48/20 |
| | | 455/434 |
| 2013/0114408 A1 | 5/2013 | Sastry et al. |
| 2014/0003261 A1* | 1/2014 | Glllett ................... H04W 48/16 |
| | | 370/252 |
| 2014/0192639 A1 | 7/2014 | Smirnov |
| 2014/0376451 A1* | 12/2014 | Sterman ................ H04L 45/123 |
| | | 370/328 |
| 2015/0365325 A1 | 12/2015 | Hwang et al. |
| 2022/0212099 A1 | 7/2022 | Fraser |

\* cited by examiner

| Node # | Bits (leaf=0, nonleaf=1) | Original Subnet IDs | New Subnet IDs | Bin Rank | Word Popcount | Seq. ID |
|---|---|---|---|---|---|---|
| 1 | 1 | | | 0 | | |
| 2 | 1 | | | | | |
| 3 | 1 | | | | 3 | 0 |
| 4 | 0 | 1 | 1 | | | |
| 5 | 1 | | | | | |
| 6 | 1 | | | | 2 | 3 |
| 7 | 1 | | | 5 | | |
| 8 | 1 | | | | | |
| 9 | 0 | 4 | 2 | | 2 | 3 |
| 10 | 0 | 5 | 3 | | | |
| 11 | 0 | 6 | 4 | | | |
| 12 | 1 | | | | 1 | 2 |
| 13 | 0 | 10 | 5 | 8 | | |
| 14 | 0 | 2 | 6 | | | |
| 15 | 0 | 3 | 7 | | 0 | 0 |
| 16 | 0 | 7 | 8 | | | |
| 17 | 1 | | | | | |
| 18 | 0 | 8 | 9 | | 1 | 1 |
| 19 | 0 | 9 | 10 | 9 | 0 | |

FIG. 4A

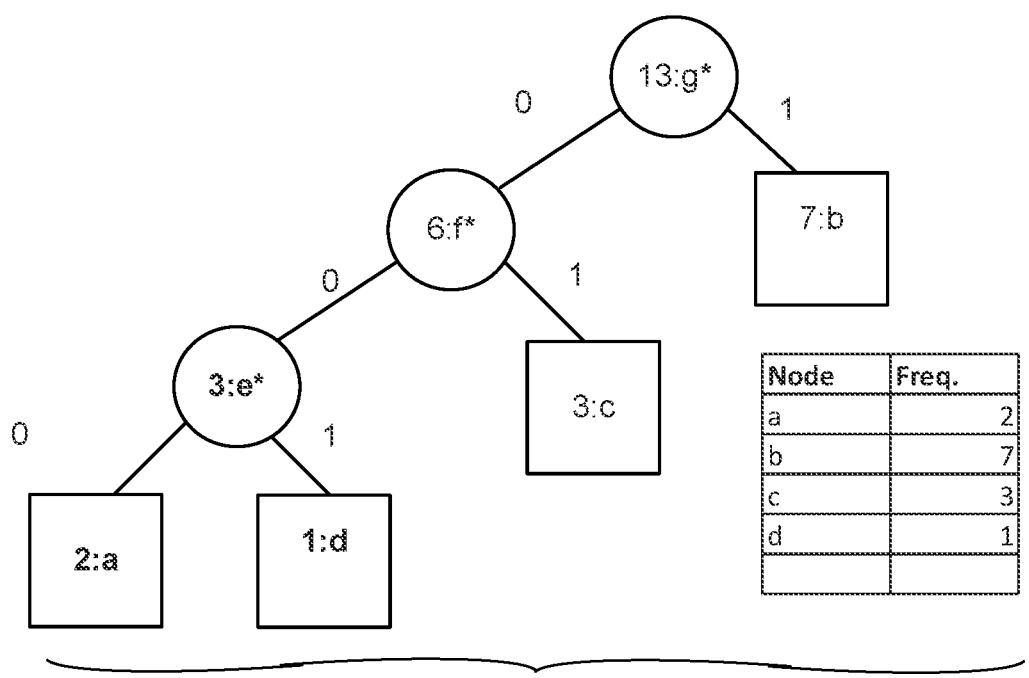
FIG. 5B(1)

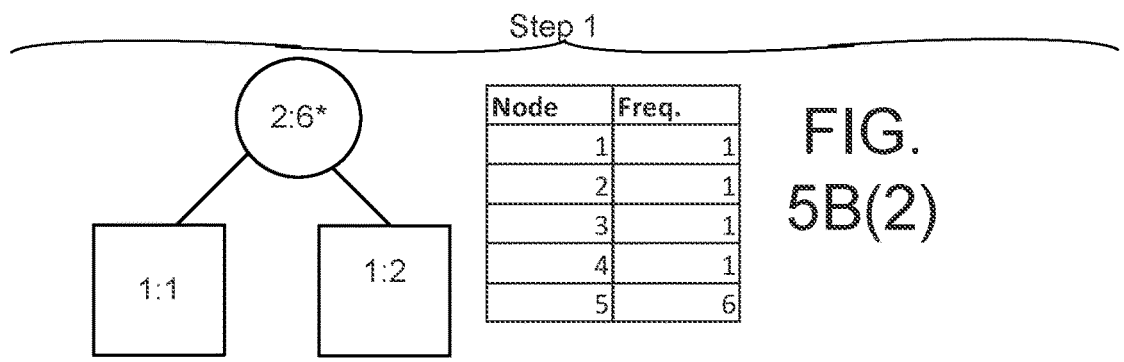
FIG. 5B(2)
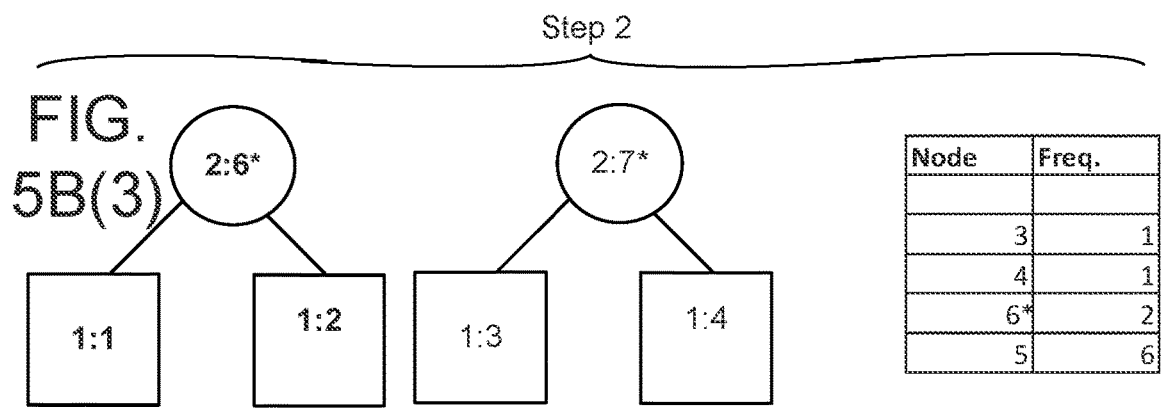
FIG. 5B(3)
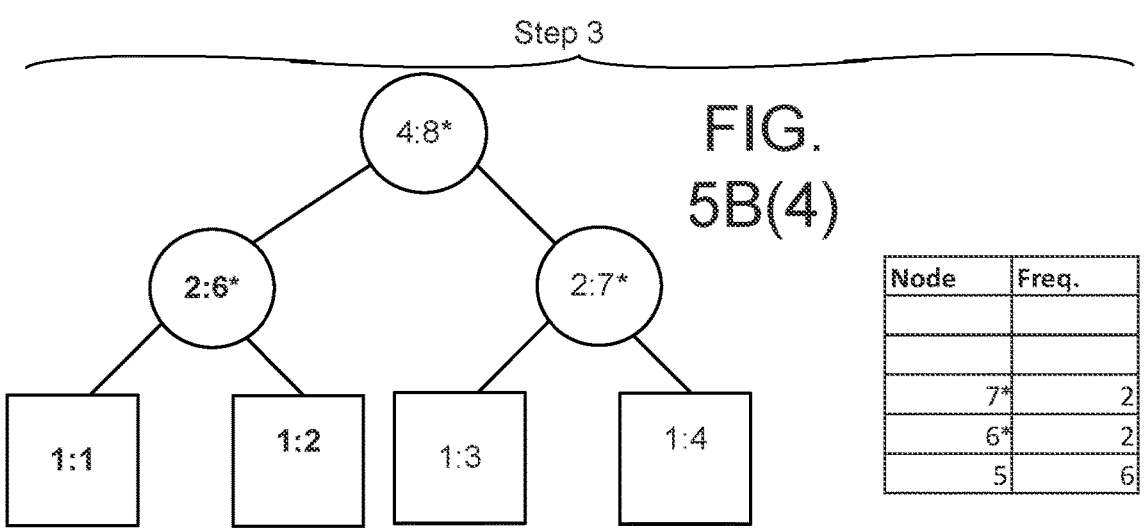
FIG. 5B(4)

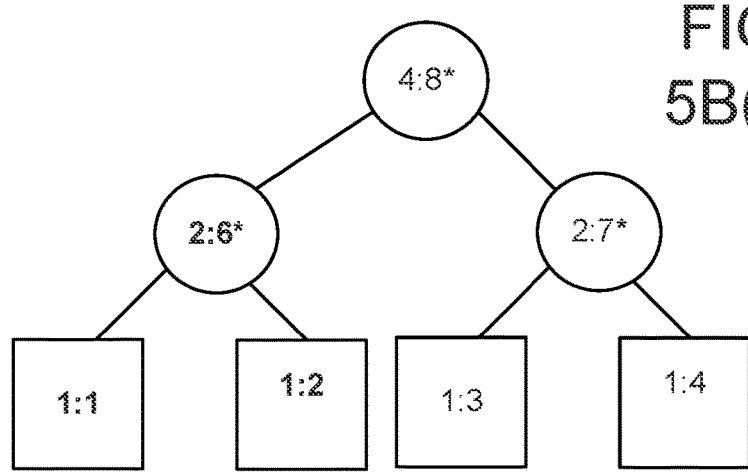
FIG. 5B(5)
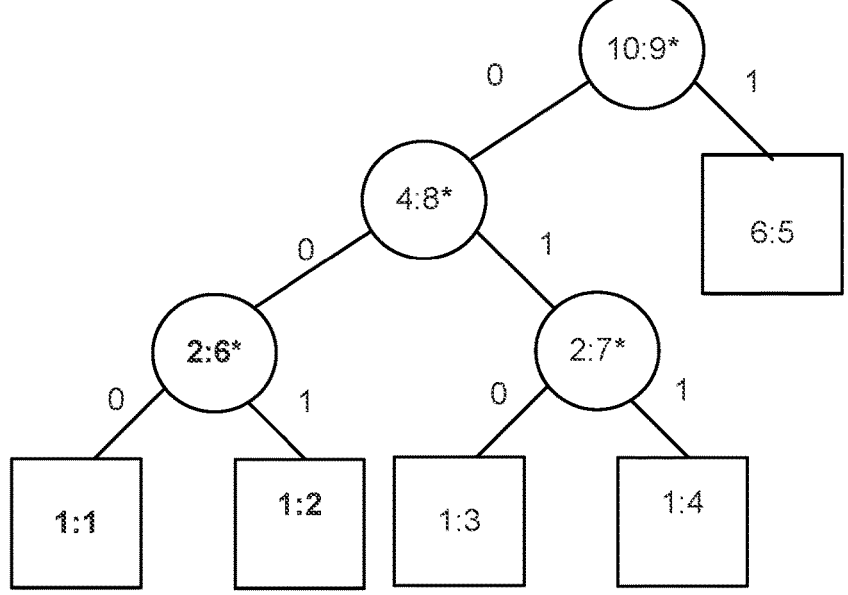
FIG. 5B(6)

550

| Subnet ID | Start of Bin | Bit Code of Locaiton Coordinates |
|---|---|---|
| 1 | 1 | 1 |
| 2 | | 1 |
| 3 | 3 | 1 |
| 4 | | 1 |
| 5 | | '000 |
| 6 | 6 | 1 |
| 7 | | 1 |
| 8 | | '011 |
| 9 | | '010 |
| 10 | | '001 |

553 → Subnet ID column
554 → Start of Bin column
556 → Bit Code of Location Coordinates column
552 → rows grouping

FIG. 5C(1)

| bit code | Long. | Lat. |
|---|---|---|
| 1 | 41 | -74 |
| '011 | 135 | -83 |
| '010 | 33 | -83 |
| '001 | 33 | -91 |
| '000 | 47 | 104 |

| Subnet ID | Start of Bin | Bit Code of Avg. Location | Bit Code of Location Coordinates |
|---|---|---|---|
| 1 | 1 | 0100 | 10 |
| 2 | | | 10 |
| 3 | 3 | 0101 | 110 |
| 4 | | | 110 |
| 5 | | | 0000 |
| 6 | 6 | 0110 | 111 |
| 7 | | | 111 |
| 8 | | | 0001 |
| 9 | | | 0010 |
| 10 | | | 0011 |

FIG. 5D(1)

| | | |
|---|---|---|
| 10 | 0 | 0 |
| 110 | -31 | 3 |
| 0000 | 63 | -6 |
| 111 | 2 | -30 |
| 0001 | -6 | -39 |
| 0010 | -6 | -47 |
| 0011 | 8 | 148 |
| 0100 | 41 | -74 |
| 0101 | 72 | -77 |
| 0110 | 39 | -44 |

| Subnet ID | Start of Bin | Bit Code of Avg. Long. | Bit Code of Avg. Lt. | Bit Code of Latitude | Bit Code of Longitude |
|---|---|---|---|---|---|
| 1 | 1 | 11111 | 01001 | 00 | 00 |
| 2 |   |   |   | 00 | 00 |
| 3 | 3 | 11101 | 0101 | 1010 | 1011 |
| 4 |   |   |   | 1010 | 1011 |
| 5 |   |   |   | 11110 | 011 |
| 6 | 6 | 10000 | 10011 | 1100 | 1101 |
| 7 |   |   |   | 1100 | 1101 |
| 8 |   |   |   | 011 | 10010 |
| 9 |   |   |   | 011 | 01000 |
| 10 |   |   |   | 10001 | 11100 |

FIG. 5E(1)

| Bit Code | Coordinate |
|---|---|
| 00 | 0 |
| 011 | -6 |
| 0101 | -77 |
| 01000 | -47 |
| 01001 | -74 |
| 1010 | -31 |
| 1011 | 3 |
| 1100 | 2 |
| 1101 | -30 |
| 10000 | 39 |
| 10001 | 8 |
| 10010 | -39 |
| 10011 | -44 |
| 11100 | 148 |
| 11101 | 72 |
| 11110 | 63 |

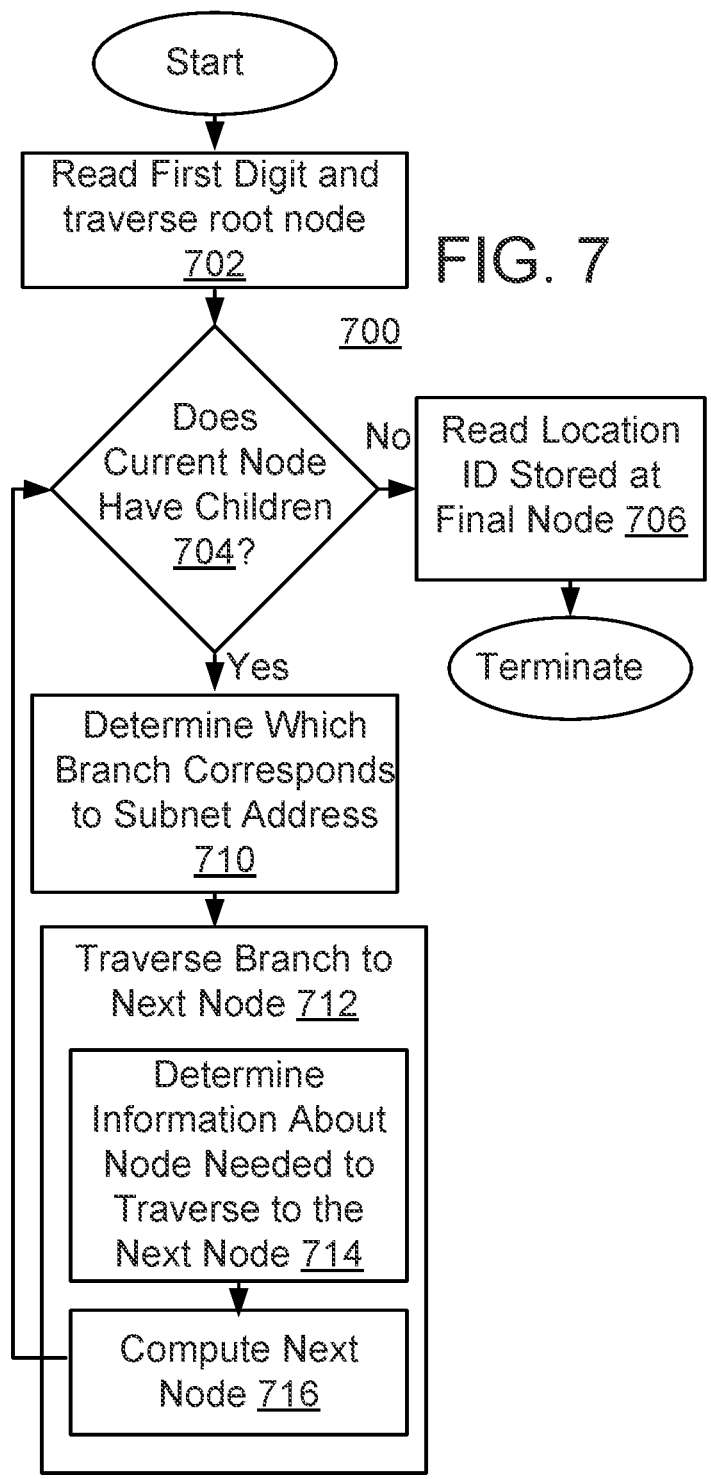

SELECTING A CONNECTION IN A NETWORK

CROSS REFERENCE TO RELATED APPLICATIONS

This application is a continuation-in-part of U.S. Non-Provisional application Ser. No. 16/726,713, entitled "SELECTING A CONNECTION IN A NETWORK," filed on Dec. 24, 2019, by kin Kibet Fraser, which is incorporated herein by reference, is a continuation-in-part of U.S. Non-Provisional application Ser. No. 15/168,213, entitled "SELECTING A CONNECTION IN A NETWORK," filed on May 30, 2016, by kin Kibet Fraser, which is incorporated herein by reference, which claims priority benefit of U.S. Provisional Patent Application No. 62/168,461, entitled "SELECTING A CONNECTION IN A NETWORK," filed on May 29, 2015, by Iain Kibet Fraser, which is incorporated herein by reference and also claims priority benefit of U.S. Provisional Patent Application No. 62/197,399, entitled "SELECTING A CONNECTION IN A NETWORK," filed on Jul. 27, 2015, by Iain Kibet Fraser, which is incorporated herein by reference.

FIELD

The current specification is related to selecting a connection in a network that will provide a satisfying user experience.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A problem that arises when playing video games online (for example) is often the connection is not very good, which leads to a frustrating video game experience. Similar problems may arise in choosing an appropriate server for a particular service when there are multiple servers available for providing the same or similar services, and the user may be connected to a server with a bad connection for that user even when other servers with better connections for that user are available.

Although some online video games include a mechanism for selecting a server with a good connection, the mechanism does not work well and often establishes a connection with a server that does not provide good service for that player. For example, players in the UK may find themselves playing players in Mexico, despite there being players located much closer by.

BRIEF DESCRIPTION OF THE FIGURES

In the following drawings like reference numbers are used to refer to like elements. Although the following figures depict various examples of the invention, the invention is not limited to the examples depicted in the figures.

FIG. 4A shows an example of the tree of FIG. 3B that may be searched efficiently while compressed.

FIG. 5B(1) shows a first tree, which represents an example of an encoding of a collection of location coordinates in which location coordinates that occur more often are encoded by shorter strings of symbols and location coordinates that occur less frequently are encoded with longer strings of symbols.

FIGS. 5B(2)-5B(6) show different steps of a method of constructing a tree that determines an encoding of a collection of sets of location coordinates in which location coordinates that occur more often are encoded by shorter strings of symbols and location coordinates that occur less frequently are encoded with longer strings of symbols.

FIG. 5B(2) shows step 1 of a method of encoding a collection of location coordinates of a set of subnets, which includes an initial partial tree and an initial list of identifiers of location coordinates of a set of subnets.

FIG. 5B(3) shows the next step, step 2, of a method of encoding a collection of location coordinates of a set of subnets, which includes an updated list of frequencies and an updated partial tree created from the updated set of frequencies.

FIG. 5B(4) shows the next step, step 3, of a method of encoding a collection of location coordinates of a set of subnets, which includes an updated list of frequencies and an updated partial tree created from the updated set of frequencies.

FIG. 5B(5) shows the next step, step 4, of a method of encoding a collection of location coordinates of a set of subnets, which includes an updated list of frequencies and an updated partial tree created from the updated set of frequencies.

FIG. 5B(6) shows the next step, step 5, of a method of encoding a collection of location coordinates of a set of subnets, which includes an updated list of frequencies and an updated partial tree created from the updated set of frequencies.

FIG. 5C(1) is an example of an index that may be used for looking up a binary representation of the location coordinates of a subnet of interest.

FIG. 5C(2) shows an index associating the binary representation of the index of FIG. 5C(1) with the set of coordinates that are represented by the binary representation.

FIG. 5D(1) is an example of another index that may be used for looking up a binary representation of the location coordinates of a subnet of interest.

FIG. 5D(2) shows an index associating the binary representation of the index of FIG. 5C(1) with the set of coordinates that are represented by the binary representation.

FIG. 5E(1) shows an example of a location index having bit codes.

FIG. 5E(2) shows an example of an index for converting the bit codes of FIG. 5E(1) into numerical values.

FIG. 7 shows a flowchart of an example of the method of converting a subnet address into a subnet identifier, which may be used in part of one of the steps of FIG. 6.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Although in this specification, the example of a players playing an online game is often used, other types of users may be substituted for the players and other services may be substituted for a game to obtain different embodiments. Although the specification refers to packets any message may be substituted for a packet wherever the word packet appears to obtain a different embodiment.

The Network of this Specification

Figure 1:
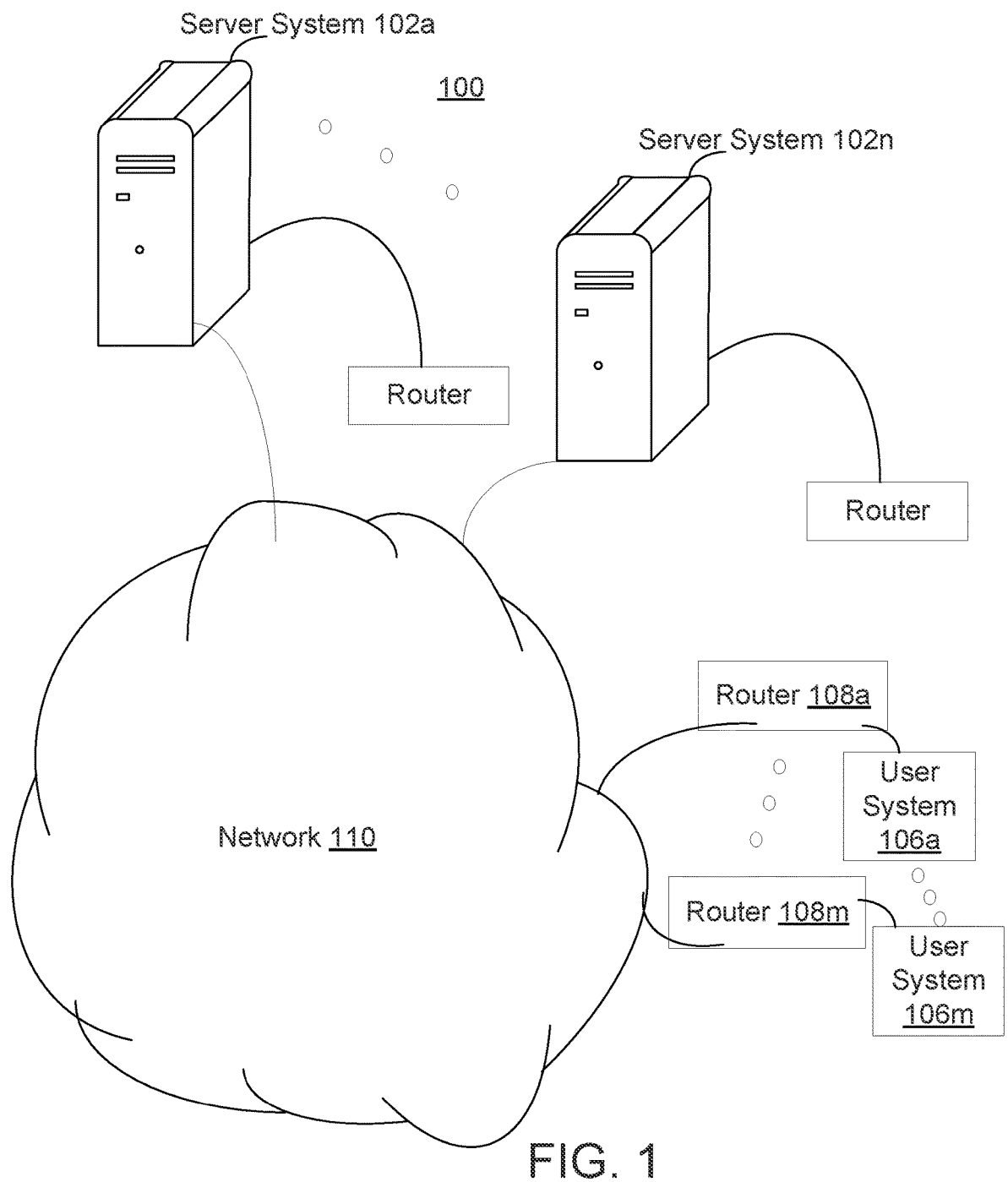
FIG. 1 shows an example of a network in which the system may be used.

FIG. 1 shows an example of a system 100 within which the current system may be used. System 100 may include a multiplicity of server systems 102*a-n* and a multiplicity of user systems 106*a-m* having routers 108*a-m* connected to a network 110. In other embodiments, system 100 may include additional components and/or may not include all of the components listed above.

System 100 may be used for playing games and/or other purposes. Server systems 102*a-n* are a system of servers, which provide a particular service to users, such as an online game. Any of server systems 102*a-n* may be referred to as hosts and are dedicated to a particular task or user system performs that task for other users. In this specification, the term host refers to servers that are dedicated to a particular task or user system that performs that task for other users. The that server systems 102*a-n* may be dedicated to the task of running the game and/or dedicated to another player in the game. For example, one of server systems 102*a-n* may be dedicated, as in the computer/host's only purpose is to be the server for the other players, or it may be a "listen host," which is a host/computer server of the other players, and is also being played on by one of the players. Effectively one of the players is the host for one or more other players.

In an embodiment, all players connect to the host, and the host dictates how the game is synchronized. Due to the host's position, the host has the highest influence on game quality and therefore the aim is to pick a good host. Some games may allow more than one host.

User systems 106*a-m* are the systems used by users to access the service, via a network. User systems 106*a-m* may be any of a variety of computing systems, such as smart phones, laptops, personal computers, and/or game consoles. In an embodiment, the user systems 106*a-m* of one of the users may be the server system, i.e. the host, and others of user systems 106*a-m* may connect to the user system of the user that is hosting the session and/or facilitating the connections. In an embodiment, the user system of one of the users may be the server system, i.e. the host, and other user systems may connect to the user system of the user that is hosting the session/facilitating the connections.

Routers 108*a-m* are used by user systems 106*a-m* to connect to servers 102*a-n* to access the service. Although in FIG. 1 there is only one router for each user device, there may be several user devices sharing one router and any given user system may have a choice of multiple routers for accessing the network. Routers 108*a-m* are examples of Internet nodes, and other network appliances may be used instead of routers 108*a-m* as Internet nodes. In this specification, anywhere a router is referred to, any Internet node may be substituted to obtain another embodiment.

Routers 108*a-m* intercept incoming and outgoing packets for a user and selectively filters the packets based on certain metrics. The filtering mechanism of routers 108*a-m* may selectively decide whether to drop or not drop packets. By dropping packets from hosts deemed to be of a bad quality, the user is hindered or prevented from choosing that host, which may result in the user system continuing to search for a better host.

In other words, software may be installed in the routers 108*a-m* to select the best one of servers 102*a-n*, or provide the user with a list of servers that have a higher quality connection from which the user may choose, and to avoid establishing connections with servers that do not have a good connection available. Subsequently, each of user systems 106*a-m* may receive a filtered list indicating the best server or indicating a subset of servers that are currently the best servers that are available. In an embodiment, user systems 106*a-m* may not get a list of servers, but may just not connect to servers having bad connections, and when a server is found that is expected (based on a metric) to provide a bad connection, the user's system may have to search again for another server until a server with a good connection is found. In an embodiment, whether the user is given a list of servers or just keeps testing servers found, until a server with a good connection is found, depends on how the game handles not being able to connect to the bad host. In an alternative embodiment, the user may make a selection that determines whether a list of servers is provided or whether the testing of servers continues until one with a good connection is found. In an embodiment, the filters work in the same manner for different types of hosts, in that the filters will filter the hosts regardless of the type of host.

Network 110 is the network used by user systems 106*a-m* to access servers 102*a-n*. Network 110 may include a combination of many different networks.

Accordingly, routers 108*a-m* intercept incoming (from network 11) and outgoing packets (sent via network 110) for players and selectively filter the packets based on certain metrics (deciding whether to drop or not drop packets). By dropping packets from hosts deemed to be of a bad quality, it forces the game to at least not choose that host and possibly to continue searching for better hosts (a packet may be intentionally—and automatically—dropped by automatically deciding to not send an acknowledgement of the arrival of the packet even though the packet in fact arrived). Stated differently, the protocol interprets a dropped packet as a bad connection, and the router manipulates the server and/or a client (or the protocol in use at the host and/or client) by intentionally dropping packets. When the router determines that the connection is not likely to be a good connection, the router intentionally drops a packet that would not otherwise have been dropped. As a result of the protocol used by the client and/or host, the client and/or host interpret the dropped packet as a bad connection, and the client and/or host cease to attempt to establish the connection. In other words, modules (e.g., software or hardware modules) may be installed in the router to select the best server, or provide a list of servers having a higher quality connection from which the user may choose, and to avoid establishing connections with servers for which a good connection is not available (e.g., by dropping packets). Subsequently, an end user device may receive a filtered list indicating the best server or a subset of servers that are currently the best servers available. The software for determining the quality of the connection and/or for causing the dropping of the packets may be located in any of the network nodes instead of and/or in addition to being located in the router.

Examples of Modules of the Routers of this Specification

Figure 2:
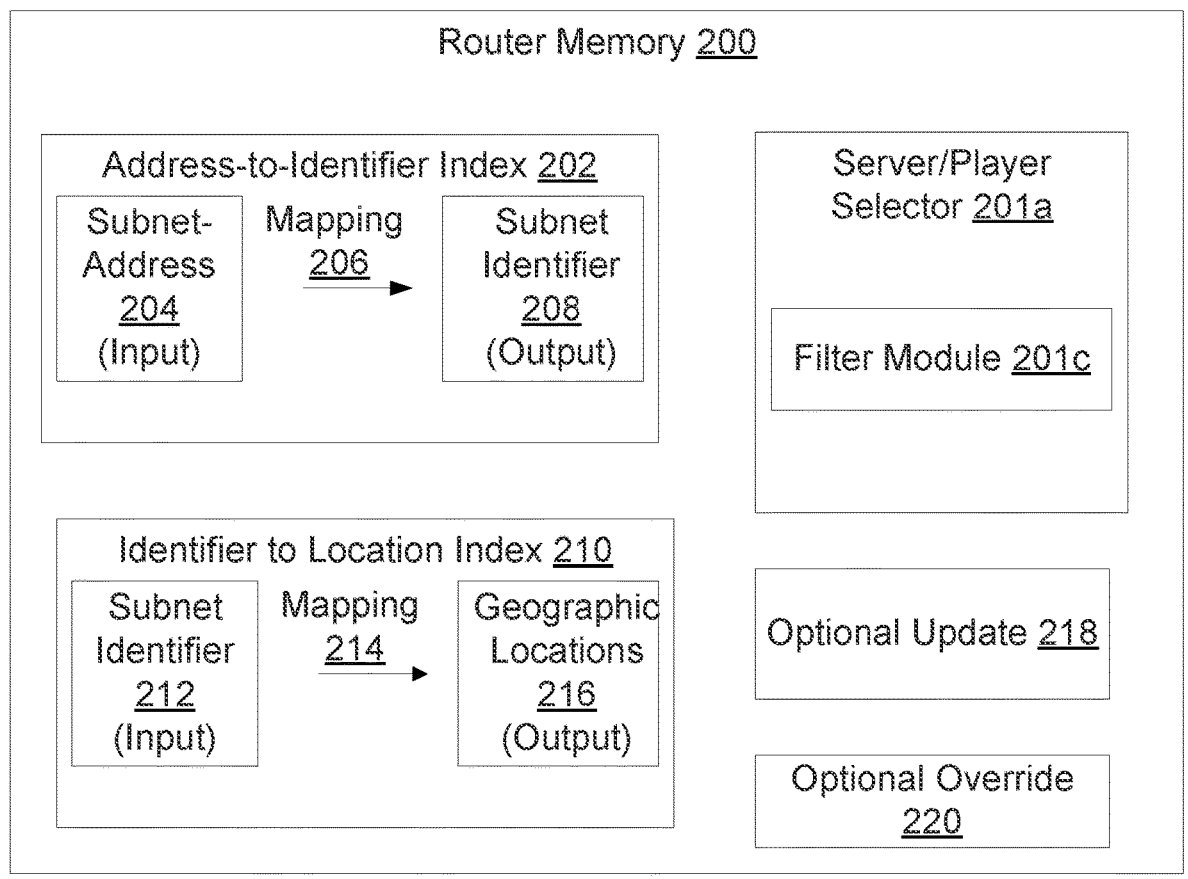
FIG. 2 shows a block diagram of an example of modules that may be stored in the routers of FIG. 1.

FIG. 2 shows a block diagram an example of a unit 200 of modules that may be stored in the routers and/or servers of FIG. 1. Unit 200 may include optional server selector 201a, optional player selector 201b, filter 201c, update 201d, and address-to-identifier index 202 having subnet address 204, mapping 206, and subnet identifiers 208. Unit 200 may also include identifier-to-location index 210 having location-input 212, mapping 214, and subnets 216. In other embodiments, unit 200 may include additional components and/or may not include all of the components listed above.

Unit 200 includes modules that ensure that the connections established for completing a particular task or receiving a particular service (such as playing an online game) are appropriate for the task being performed or service received. Unit 200 may be installed in any (or all) of routers 108a-m and/or within server systems 202a-n (on in routers of server systems 202a-n).

Note that a software or hardware version of unit 200 may be used with a software router. For example, it is possible to configure a normal computer with two network cards and then install a software router on the computer, so that the computer behaves like a router in that that computer can forward packets from one device (e.g., the game console) to another device (e.g., another router). The unit 200 (the filtering software of the router of this specification) may be used with a computer configured to behave as a router as well as with a router.

Also, some of user systems 106a-n (e.g. some PC games) have a bad host selection algorithm, as well. A version of unit 200 that runs on the PC (or any network appliance) may be installed on the PC that intercepts packets, and filters the packets, using one of the above metrics. Although a PC having unit 200 may be filtering packets, the PC is not necessarily behaving as a router, because a PC does not forward packets. However, unit 200 may also be run on a computer (e.g., that runs a game on a PC) to intercept and filter packets and select a host with an appropriate connection (in contrast, consoles do not allow software to be run on them, other than games' and the console's proprietary software, and so a proprietary version of the software would need to be installed).

In other words, a router of routers 108a-m may act as gateway between the user's device and the host. As a result of the router having an interface accessible by a web browser, which may be any network capable device (any network appliance) having a browser—including the user device, may apply filtering settings that are applied to a version of unit 200 that is installed at the webserver, without the need for the direct installation of unit 200 on the user's device. Alternatively, unit 200 may be a plugin to an HTTP client running on one of user device 106a-n.

Since routers have a small amount of memory, a compression algorithm may be used by unit 200 to store information on the router, which aids in running the algorithm. Additionally, because routers are limited in memory and processing power, it is contrary to the current manner of thinking to load and run filtering software on a router (or to install most other software that is unrelated to the basic functioning of the router), and then, in turn, use the software on the router to provide additional features, options and software functionality to other devices (which commonly have more memory and greater processing power than the router itself). Routers have at least three constraints that need to be dealt with simultaneously, which are a small amount of flash memory (which serves as permanent memory that persists when the router loses power), a small amount of RAM (which is used while the router is running) and a small amount of processing power. Because of the low memory and processing power, when the software is run on a router, the IP database must be compressed when saved, this specification recognizes that it may be desirable for the database to remain compressed when lookups are performed and it may be desirable to perform the lookups in a highly efficient manner, which is a difficult task as a result of the three constraints of routers (a small amount of RAM, a small amount of flash memory, and low processing power).

The present software allows a selection of servers to be made that would otherwise not be possible or at least not be practical for the user to make using the user device (e.g., a game box), the default options of the user's game, or the server provided by the game forum. As mentioned above, although the software is described using the example of an online game, the online gaming environment is just an example, and the software may be used for selecting servers that will provide good connections, for other purposes, such as general internet use. In other words, in this specification, although playing games over the Internet is discussed, as an example, the system of the specification may be used for other purposes in which there is a choice of servers available to a user to select from for providing the same or similar content and/or user experiences, such as network TV and/or other network services. In this specification, any network may be substituted for the Internet and/or used in combination with the Internet.

The technology can work in the reverse direction, and a server may make sure that the clients connecting are clients that are likely to receive a high quality connection. Specifically, the game may have options for allowing a player to host the game session, with the player's console being the server. For example, the player might choose to host a game session in the hopes that others will join the game session and play with the player. Based on the player's proximity to other game players, the player might be a good host for the players that are nearby, and a bad host for those far away from the player. However, the interface built into the game the player is playing may have no way of distinguishing between good hosts and bad hosts. Consequently, a player in San Jose and a player in Tokyo might join a game session hosted by a player in San Jose, expecting to have an experience of the same quality, when the connection for the Japanese player might be very poor. The software may be used to filter out the players that are beyond a certain distance or that for other reasons are expected to have a bad connection.

Optional server selector 201a selects a server having a connection that is of a quality appropriate for performing the task or receiving the service. Optionally, the user systems 106a-m and/or optional server selector 201a may include a list of acceptable servers that the user may connect to for the desired service, and user systems 106a-n and/or optional server selector 201a may include an algorithm for selecting one of the servers on the list.

On the user interface, when the user's device has its own software for choosing servers for hosting the game, the optional server selector 201a may provide the user with two lists of servers. The first list having the servers chosen by the present software, and the second list having the servers chosen by the software on the user's device, but which were not selected by the present software.

However, in an embodiment, the user systems 106a-m may not get a list of servers from servers 102a-n, but optional server selector 201a may just cause the router (of routers 108a-m) not connect to servers having bad connections, and when a server is found that is expected (based on a metric) to provide a bad connection, the user's system (e.g., one of user system 106a-m) may have to search again for another server until a server with a good connection is found. In an embodiment, whether the router or user system is given a list of servers or just keeps testing servers found, until one with a good connection is found, depends on how the game or other service handles not being able to connect to the bad host. In an alternative embodiment, the user may make a selection that determines whether a list of servers is provided or the testing of servers continues until one with a good connection is found.

Optional player selector 201b may select players of a game that are limited to those that the user may establish a connection with that is expected to be of an adequate quality for playing the game with. Optional player filter 201b may be located on server system 202a-n or on the routers of server system 202a-n, but not on router systems 108a-m of user system 106a-n. A user system that includes its own server may include both sever selector 201a (for situations when accessing another server) and player selector 201b (for when the user is using their own server).

Filter 201c filters out packets from players and/or servers that are expected to not be of an adequate quality. Filter 201c may include a filter that filters out connections based on the geographic location that the device of the player or server (in other words, filter 201c may be a geo-filter). Optional server selector 201a and optional player selector 201b may use filter 201c to select an appropriate server and/or player. In an embodiment, filter 201c accomplishes the tasks of both optional server selector 201a and optional player selector 201b, and optional server selector 201a and optional player selector 201b are not present.

For example, an ordinary computer or other internet appliance having a processor and memory may run a program causing the network appliance to function as a router, which may run filter 201c for choosing servers that are likely to provide a good connection.

The quality of the connection between one of server systems 102a-n and one or user systems 106a-m may be established (e.g., by filter 201c) in any of several manners, such as geo-graphical distance, linear distance, hop distance, ping time, and/or geographical locality, for example. The geographical distance is the distance on the surface of the Earth from the player to the host. The linear distance is the total distance of the wires that make a route from the player to the host. The hop distance is the number of routers between player and the host. The ping time is the time that it takes for a network (e.g. an Internet) packet to travel between the player and the host.

In at least some embodiments it may be impossible, or at best difficult, to determine the actual wire length from one router to another without some external information, which may be not available. Similarly, in at least some situations it may also be difficult to obtain a reliable measure for the hop distance.

The geographical location, used by filter 201c, may be a geographic location of any shape outlining a region within which a good connection is expected to be establishable, via network 110, which may correspond to how well the network infrastructure is maintained within a certain locality, which in turn may correspond to a municipal or politically established region, such as within the limits of a certain city, town, county, province, country, block of countries, continent and/or other region. Alternatively, the geographic location may be within a circle of a given radius from the user or within a polygon or other geometric shape within which the user is located. A shape may be determined on the world (e.g., a polygon or a region for example Europe or North America) and packets from any hosts outside of that location are filtered out (no matter the shape of the locations).

In one embodiment, the geographic distance from one of user systems 106a-m and a candidate for the server system (selected from server systems 102a-n) or candidate player is used as an indication that the server will have a good connection or whether the connection with the player will be adequate. In this embodiment, packets outside of the geographic distance are inspected to determine the ping time. If the ping time is below a certain predetermined threshold, the packet is allowed to pass, because the packet is likely a packet from within the geographic distance, but that was mislabeled. Alternatively, the ping time may be low for other reasons, and the connection is allowed because the ping time is low enough to facilitate a high quality user-to-host connection that would be comparable to a connection between users and a host within a geographic distance that is expected to result in a good connection.

Although the primary goal is to minimize the ping time, since minimizing the ping time is not easy to do, and in some scenarios minimizing the ping time cannot be done, a geo-filter, such as filter 201c, may be used instead, because the geographic distance correlates well with ping time. For example, a large geographic distance will usually mean a large ping time and vice versa. Alternatively, or additionally, the ping time may be used as the only metric and/or in conjunction with other metrics for determining whether to filter out a packet.

Some of user devices 106a-m, such as conventional gaming consoles, may not have the ability to freely download and install software, or download software at the user's discretion. Consequently, devices and games that do not provide an option or feature may never be able to provide a new option or feature, unless the maker of the device or the maker of the game expressly changes the device or changes the game. As a result, if the user device or game does not allow the filtering of hosts by default, the user may never be able to rely on the device or software for filtering hosts.

The filtering 201c within units 200 of the routers 108a-m provides the user systems 106a-m with (1) an ability to filter hosts that the user system or the user's game may lack, and (2) a web browser accessible interface, which allows the user to apply and/or modify various settings for filtering hosts or players. A web interface is just one way to provide an interface to the user. In this specification, the term web interface and user interface are used interchangeably and may be substituted with one another to obtain different embodiments. Any user interface that allows the user to control settings of the router and/or console may be used for the user interface.

Update 201d provides a mechanism for updating the firmware of a router that is in use to provide additional software functionality and interfaces that were not originally present on the router.

Implementation of the Geographic Filter of Filter 201c

The geographic filter maps Internet Protocol (IP) addresses to geographic locations (longitude and latitude coordinates). Based on the mapped location, the software determines whether packets sent or received from that IP address are allowed or dropped. Among other things, the algorithm maps IP addresses to locations as quickly as possible, while keeping a small database.

IP addresses are usually allocated in blocks. All of the addresses within any given block are typically in the same data-center, and therefore assigned the same location. By assigning all of the IP addresses of any give block to one data-center and location, the algorithm does not need to store IP addresses, but may instead store IP subnets (a subnet may be a range of IP addresses, for example the range of IP addresses, 1.2.3.0-1.2.3.255 may be one subnet). In this specification, the term IP address is used interchangeably with the term subnet, and one term may be substituted for the other to obtain different embodiments, unless explicitly stated otherwise.

To map subnets to geographic locations at least two indexes may be maintained.

An identifier-to-location index 202, which may be referred to as NetIdx, may be maintained, which the first index that may be maintained. The identifier-to-location index 202 is a fast IP subnet index. that maps each subnet of interest to an identifier that labels the subnet (which is later used to determine the region associated with the subnet), Subnet 204 is the input of the identifier-to-location index 202, which accepts a representation of a subnet address as an input. Mapping 206 maps the subnet address of the input, subnet 204, to a geographic location. Geographic subnet identifiers 208 is a collection of geographic locations that are stored in a manner (e.g., a binary tree) that facilitates quick processing. Geographic subnet identifiers 208 are the outputs of identifier-to-location index 202.

An identifier-to-location index 210, which may be referred to as a GeoIdx, may be maintained, which may be the second index that may be maintained. The identifier-to-location index 210 is an index of geographic locations. GeoIdx may be the geographic index for the NetIdx and provides (or maps) the geographic locations that are associated with the NetInx subnets. Subnet identifier 212 is an arrangement of information, via which a geographic location corresponding to a given subnet identifier may be generated. Subnet identifier 212 are the inputs of identifier-to-location index 210. Mapping 214 maps the subnet identifier 212 of the input to the geographic locations as the output. Geographic location 216 is the output of the identifier-to-location index 210, which accepts a representation subnet identifier as an input.

To further elaborate, given a subnet, as input to the NetIdx, the NetIdx may return an integer that is an identifier for the subnet, which when used as input to the GeoIdx, the GeoIdx returns a location associated with the subnet. As explained above, the GeoIdx has a location associated with every subnet x in the NetIdx. Depending on the programming code used, a location that is associated with an IP address, x, is given by the expression, GeoIdx(NetIdx(x))

In other words, the GeoIdx returns the geographic coordinates as output, when GeoIdx receives as input, the output of NetIdx, where the input of NetIdx was the IP address x (which may be truncated by NetIdx to obtain a subnet address that is stored in the NetIdx).

Data Used to Construct an Example

Figure 3A:
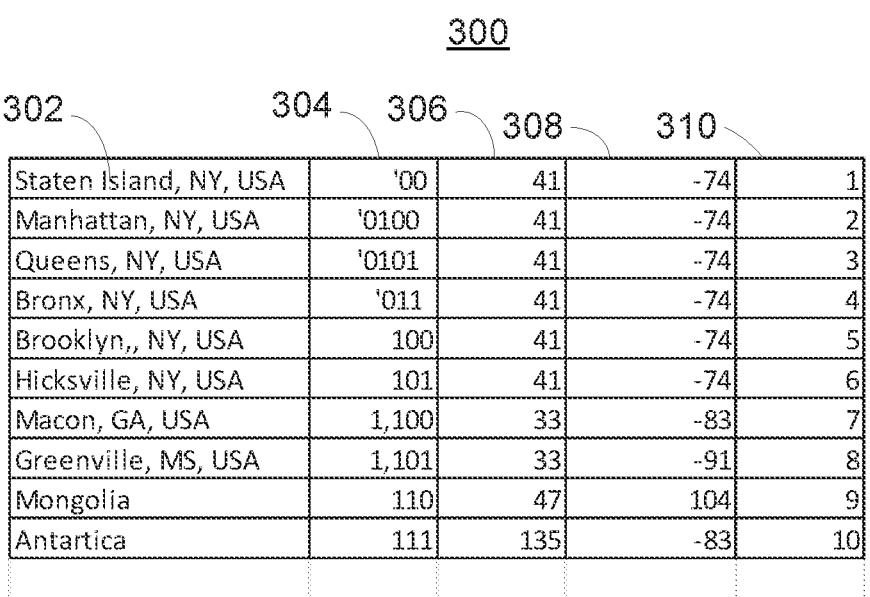
FIG. 3A shows a table of data that is used to construct some of the examples that follows.

FIG. 3A shows an index 300 of data that is used to construct many of the examples that follows. Index 300 includes locations 302, frequency 304, latitude 306, longitude 308, and subnet IDs 310. In other embodiments, other data may be used for constructing a similar example, which may have other columns in addition to and/or instead of the columns of FIG. 5B.

Locations 302 are a list of locations of a fictitious network from which packets are received at a router. Frequency 304 is the frequency in terms of packets received during a particular unit of time. For example, frequency 304 may be computed as number of packets received from a given subnet per hour. As another example, frequency 304 may be computed as number of packets received from a given subnet per month. Latitude 306 is a latitude that is associated with the subnet, and longitude 308 is a longitude that is associated with a subnet. Since subnets have many locations associated with each network address within the subnet, the latitude 306 and longitude 308 cannot be coordinates of the subnet, but coordinates that are roughly characteristic of the locations associated with the particular subnet address. Latitude 306 and longitude 308 may be an average latitude and average longitude of all the subnet addresses from which packets are received or may be the center of the geographic location usually associated with the subnet of interest or some other latitude and longitude that is associated with the subnet that gives some at least rough approximation for the locations of users having network addresses with the particular subnet. Subnet IDs 310 are the subnet IDs that have been found using compressed tree 500b. All of the computations in this specification may be performed by machines such as routers, servers, gaming consoles, machine that behaves as routers, servers, gaming consoles, or machines setting up the routers, the servers, gaming consoles, the machine behaving as routers, the machines behaving as gaming consoles, or the machines behaving as servers, for example.

Subnet to Location Index (NetIdx)—an Example of a Binary Tree

Figure 3B:
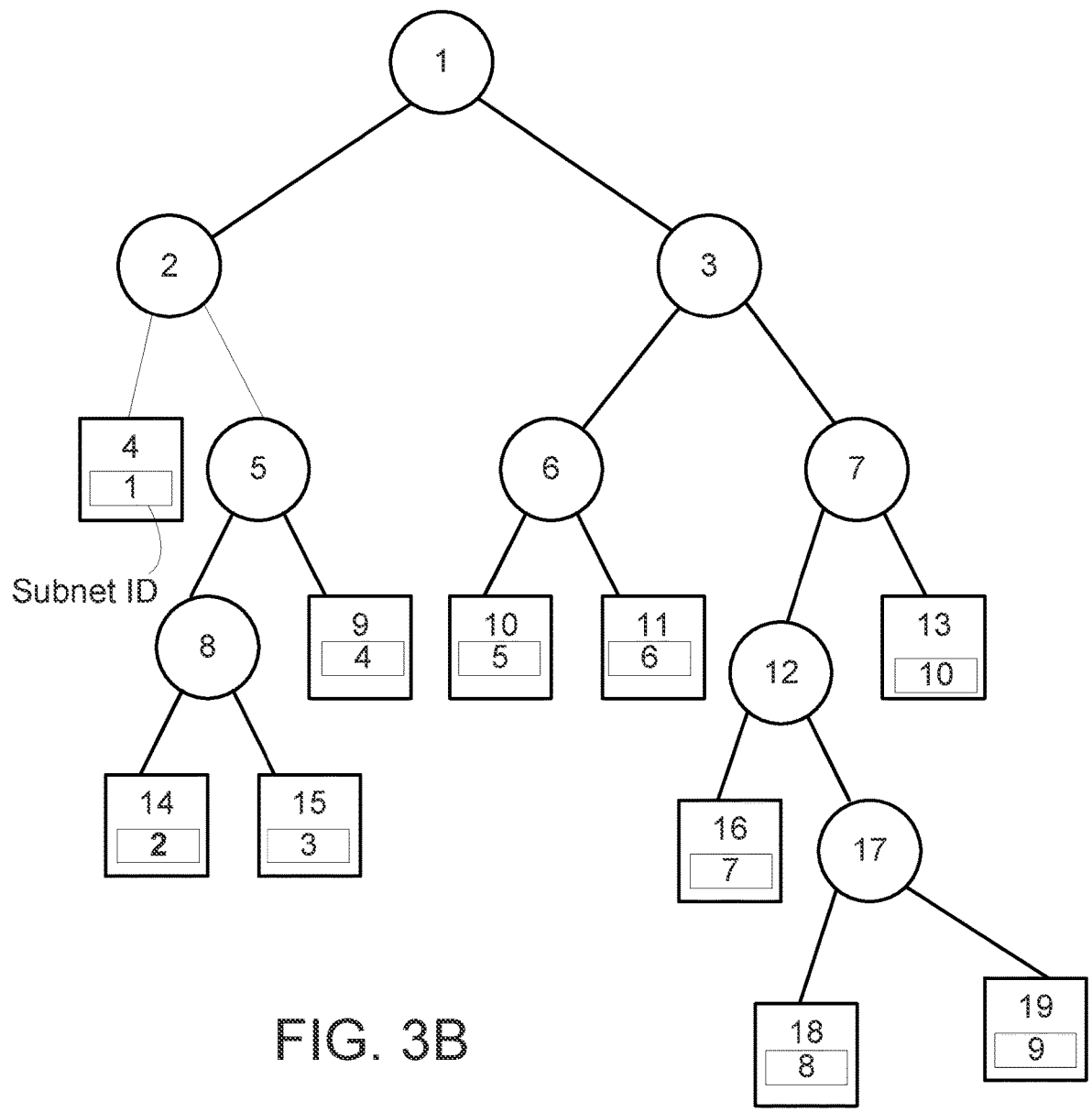
FIG. 3B in an example of a binary tree that may be used as a subnet address to subnet identifier index (e.g., as the address-to-identifier index of FIG. 2).

FIG. 3B in an example of a binary tree 350 that may be used as a subnet address to subnet identifier index (e.g., address-to-identifier index 202). Binary tree 350 may include nodes 1-19, which in-turn includes leaves 4, 9-11, 13-16, 18 and 19. Binary tree 300 also includes subnet identifiers 1-10. Binary tree 300 may include additional components and/or may not include all of the components listed above.

Binary tree 350 may be used for a subnet to location index of a network. Binary tree 350 is relatively small for simplicity. An actual binary tree for representing subnets in the Internet would be much larger. Binary tree 350 may be constructed from index 300 by, for each subnet address, starting from the root node, starting with the first digit of the subnet address, reading the current digit of the subnet address. If the current digit is a first value (e.g., 0), traversing to the left child, if the left child exists, and if the left child does not exist create the left child. Similarly, if the current digit is a second value (e.g., 1), traversing to the right child, if the right child exists, and if the right child does not exist create the right child. However, moving forward, it is more convenient to label the subnets in the order that the subnets appear in the index.

Each node of binary tree 350 have no more than two children. More specifically, each node of binary tree 350 has either two children or no children.

A leaf is a node in a tree that has no children. A leaf can be thought of as being at the bottom of the tree. Representations of geographic locations may be stored at each leaf.

Binary tree 350 is a tree full binary tree, since binary tree 350 has nodes that either have two children or no children (the node with no children is leaf), and consequently no nodes have only one child.

In FIG. 3B the nodes are numbered in a specific order. The nodes are numbered giving the nodes in the same row consecutive values with the lowest value at one end of the row, the values of the nodes increase moving along the same row until the last node of the row, which has the highest value. The first node of each row of the binary tree has the next value consecutive to the highest valued node of the prior row. Thus, in binary tree 350, the root node is numbered as node 1, because the root node is the first node of the first row. Since the binary tree 350 is a full binary tree, each row has double the number of nodes as the non-leaf nodes of the prior row, and consequently there are only two nodes in the second row, which are numbered 1 and 2. Since both nodes 1 and 2 are non-leaf nodes, the third has 4 nodes numbered 3, 4, 5, and 6. In the binary tree of FIG. 3B, the lowest valued node is the left most node and the highest numbered row is on the right. However, the lowest valued node could be the right most node and the lowest numbered row is on the left, so long as each row is numbered consistently with the other rows of the node. Also, since in practice the binary tree is never actually drawn graphically, there is some arbitrariness as to the order of the nodes, so long as the nodes are kept in the same order throughout any computation and so long as it is possibly to draw a binary tree similar to binary tree 350 that is consistent with the numbering of the nodes chosen. In other words, if one arranges the nodes with the first node as the root node as the first row and then moving down one row and arrange the nodes according to their numbers from left to right and then repeat, to find the location of each node and then what results should be a binary tree.

Although the nodes are numbered with the first node being node 1 (in other words the values of the node numbers are incremented according to the formula $n_{i+1}=n_i+1$ or $n_i=i$), the first node could be given a different number, such as 0 or another number. Also, although in FIG. 3B, each node has a value that incremented by 1, at the expense of some of the compression and/or at the expense of some of the efficiency in traversing the tree, the increment be another number or be computed according to a different formula (in other words the values of the node numbers could be incremented according to the formula $n_i=f(i)$. For example, one may use $n_i=i+c$ or $n_i=a*i+c$).

In FIG. 3B, squares are used to represent leaves and circles are used to represent nodes that have children. For example, node 1 has two children, nodes 2 and 3 as children, and therefore node 1 is depicted as a circle. Node 2 also has two children, nodes 4 and 5 as children, and therefore node 2 is also depicted as circle. Node 3 has two children, and is therefore also depicted as a circle. Node 4 also has no children, and is therefore also a leaf and also drawn as a square. Node 5 has two children, nodes 6 and 7 as children, and therefore node 5 is likewise depicted as circle, and similarly, nodes 6 and 7 each have two children and are therefore also leaves and depicted as circles.

NetIdx maps a list of subnets to integers that are identifiers of subnets (which are the input values for GeoIdx) that allow for fast lookups of location information, while keeping the location information of the subnets in a compressed format. To achieve fast lookups, the information in NetIdx is stored in a tree structure. In an embodiment, an IP address is a 32-bit number. In other embodiments, the number of bits in the address may be different (e.g., 64 bits or 128 bits). A tree is created in which every node represents a single bit in the IP address. The leaves of the tree have an index value for the geographic coordinate of the subnet, represented by that IP address.

Binary tree 350 is not stored in the typical manner, because storing a 32-bit tree in a conventional manner would require an enormous amount of memory. Instead the binary tree 350 is stored as a succinct tree (an example of a succinct tree is described by Space-efficient static Trees and Graphs. Guy Jacobson. 1989, for example). To store the binary tree 350 as a succinct tree, it may be desirable for the binary tree to be a full binary tree (and every node may have either 0 or 2 children—no nodes ever have only 1 child). To create a full binary tree, in binary tree 350, fake children (IP addresses that do not exist) may be added that point to random location-index values, for nodes that would otherwise have only one child. Optionally, all of the random location-index values of the fake children may have the same value, so that it is easy to identify the fake children.

Given a bitmap: a set of bits. The rank operator takes an index m in the set of bits and returns the total number of bits that are set to 1 and that are less than or equal to m. e.g. rank(4)=3 for following set:

101100101.

Assuming that the IP addresses are 32 bits long, since binary tree 350 is a succinct binary tree, binary tree 350 is traversed in constant time, which is the time required for O(32) operations (the reason the order of magnitude of the number of operations is 32 is because there are at most 32 bits in the assumed length of the IP addresses), which using the rank operator is asymptotically O(1) operations assuming the rank operator takes a constant amount of time per operation. In other words, since a subnet address (which is essentially a truncated IP address) is always less than 32 bits long, the time that is needed to lookup a particular subnet is always less than 32 times the time to inspect a particular node and determine which of the two edges of the tree to proceed along to arrive at the next child. The notation O(1) is often referred to as "constant time" because the time to do a lookup does not change with the number of values stored in the database. So, if there are 2 billion or 4 billion IP addresses stored, the lookup time would be the same so its referred to as constant time. See section 5 for a description of how the rank operation is implemented which includes how the succinct tree membership map is encoded.

The leaves have an associated ID which is a natural integer. In an embodiment, the leaves are put in the order that that the leaves are found doing a depth-first-search. The position of the leaves in the ordered list is the ID associated with the leaf. The ID of the leaf providers a perfect hash that is used to index the geographic coordinate index (a perfect hash has no collisions).

In another embodiment the leaves could be labeled in another fashion, such as from right to left on the binary tree. In FIG. 3B, the leaves are labeled from left to right along the tree, and thus node 4 is leaf 1 (because node 4 is the leaf the furthest left), node 14 is leaf 2 (because node 14 is the leaf that would be the furthest to left were node 4 not present), node 15 is leaf 3 (because node 15 is the leaf that is the closest to node 14 and that is on the left of node 14), node 9 is leaf 4 (because node 9 is the next leaf encountered when moving to the right from node 15 etc. The leaf labels are effectively subnet IDs.

In an embodiment, inputting the subnet identifier into the GeoIdx is performed implicitly (as the leaf's position in the tree) and therefore takes up no additional memory.

An Example of a Succinct Tree

FIG. 4A shows an example of a tree 400a that may be searched efficiently while compressed. Tree 400a includes succinct tree 401, which includes node numbers 402a, bits 404, original subnet IDs 405 and new subnet IDs 406. Tree 400a also includes bins 407, bin ranks 408, words 409, word popcounts 410, and sequence IDs 412. Tree 400a may include additional elements and/or may not include all of the components listed above.

Tree 400a stores the binary tree of FIG. 3B in a compressed form and also includes additional information that improves the efficiency with which the binary tree may be searched. Succinct tree 401 is a compressed version of the full binary tree of FIG. 3B. A succinct tree is a representation of a full binary tree in a space efficient manner. Although tree 400a is represented as an index having columns and rows, tree 400a could be represented in other manners. For example, tree 400a could be stored in an array.

Node numbers 402a are the node number from the binary tree 350 (FIG. 3B). Bits 404 are a series of 1s and 0s representing whether a node is a leaf or a non-leaf. Specifically, the succinct tree 401 is a representation of the tree of FIG. 3B in which is represented a non-leaf node by '1' and a leaf is represented by '0.' In other embodiments, non-leaf nodes could be represented by '0' and leaf nodes could be represented by '1.' Alternatively, non-leaf nodes could be represented by a first symbol, which could be any symbol, and leaf nodes could be represented by a second symbol, which can be any symbol that is different than the first symbol. Original subnet IDs 405 lists the subnet IDs in the leafs of binary tree 350 (FIG. 3B). The choice of the subnet IDs of binary tree 350 was chosen arbitrarily, so that one can see how the subnets of binary tree 350 of FIG. 3B match the subnets of the index of FIG. 4A.

New subnet IDs 406 are identifiers for the subnets, which are ordered according to the order in which the subnets appear in tree 400a.

To further elaborate, in the index of FIG. 4A, the first column, node numbers 402a, contains the numerical label of each node, and the second column, bits 404 shows the succinct representation of the tree. In the column bits 404, each non-leaf node, which was represented by a circle in FIG. 3B, and is given 1, and each leaf (which may be represented by a square) is assigned a 0.

Succinct tree 401 of FIG. 4A converts the binary tree of FIG. 3B into a bit map. One issue is how to navigate the bit map of FIG. 4A in an efficient manner. Determining the position of nodes and leaves may be facilitated by using the rank operator. The rank operator is defined as:

Rank(m)=the number of 1s up to and including position m. For example, in the tree of FIG. 4A, $$Rank(1) = 1,$$
$$Rank\ (2) = 2, \text{ and}$$
$$Rank(4) = 3.$$

Assuming that $n_i=i$, once one has the definition of rank, and if one follows the convention of always placing the position of a child of node m can be calculated by the following formula:

$$\text{Left Child}(m) = 2*\text{Rank}(m)$$
$$\text{Right Child}(m) = 2*\text{Rank}\ (m) + 1$$

When a 0 is reached, the node must be a leaf and therefore does not have any children. The root node (the node at the top of the tree) is always at position 1. If, however, $n_i=f(i)$, then Left Child(m)=f(2*Rank(f$^{-1}$(m))) and Right Child(m)=f(2*Rank (f$^{-1}$(m))+1).

As an example, referring to FIG. 4A, Rank(5)=4.

$$LeftChild(5) = 2(Rank(5) = 2(4) = 8 \text{ and}$$
$$RightChild(5) = 2(Rank(5) + 1 = 2(4) + 1 = 8 + 1 = 9.$$

Referring to FIG. 3B, one can verify that the left child is node and 8 and the right child is node 9. Thus if one receives a subnet address 101, for example, the first 1 in the subnet address 101 means that one first navigates the binary tree to the right. The next symbol of the subnet 101 is 0, which means that next one next navigates the binary tree along the left branch. Then, the final symbol of subnet 101 is a 1, meaning that the last step is to navigate along the binary tree following the right branch. Performing that procedure (navigating right, left, and then right) using the tree of FIG. 4, navigating to the left from the root node, Rank(1)=1, and so, RightChild(1)=2(1)+1=3, and so one navigates to node 3. Next, to find the left child of node 3, compute Rank(3)=3 (adding all the bits up to node 3, based on the index of FIG. 4A), and so LeftChild(3)=2(3)=6, bring the system to node 6. Next, navigating right from node 6, Rank (6)=5, and so RightChild(6)=2(5)+1=11. Reading across to the column, original subnet IDs 405, which has the subnet IDs, one can determine that node 11 has the subnet ID of 6. Then subnet ID 6 is used by identifier-to-location index 210 (which is the GeoIdx) to find a location to associate with the subnet address 101. So using the rank, one can generate and traverse a full binary tree using a very space efficient bitwise notation.

Bins 407 are buckets in which the bits of succinct tree 401 have been divided. In the example of succinct tree 401, each bucket has 6 bits.

Bin ranks 408 list the rank of the bit just before the beginning of a bin. By storing the rank of the bit just before the beginning of the bin, the rank of a bit can be calculated by adding the stored rank of the bin to the number of bits from the first bit of the bin to the current bit.

Words 409 are groups of bits within a bucket. Words 409 are the words within bins 408. Each word of the words 409 is a group of bits within one of the bins 407. By grouping the bits within a bucket into words, and storing the number of bits in each word, further saves computation time be reducing the number of additions that need to be performed. Although in FIG. 4A, each bin has only two words, and each word has only 3 bits, there may be any number of words in each bin and each word may have any number of bits.

Word popcounts 410 is the location where the popcount for each word 409 is stored. The popcount is the number of bits in the word, and is used to computer the rank.

Sequence IDs 412 are identifiers that identify the sequence of bits having the popcount listed word popcount 410.

The naïve approach of computing the rank of associated with a location of interest would be to search from the left (which is the beginning) of tree 400a to post m counting bits that are set to 1. Counting the bits from the beginning of 400a to current location has a search time proportional to O(n) and is unacceptable in the router environment, for example. The first simple solution is to use buckets. Every n bits, store the total number of bits set as equal to 1 at that point. For example, if the buckets have a size of 1000 and one wants to know rank(5053) then one takes the pre-calculated rank for bucket 5, which will give rank(5000) then count the number of bits set to 1 up to bit 53 and add the bits to get the total rank.

Computing the rank by placing the values of the locations into buckets is a good solution in that the computation of the rank, and is faster than the naïve approach. However, bit counting itself is also slow. Regarding speeding up computing of the rank further, a bucket may be divided into a bunch of words (each word may be a unit of bits, for example 8 bit, 16 bit, 32 bit or whatever size one decides to choose). Instead of reading each bit in a word and counting the number of bits set to 1, the number of bits set to 1 may be stored for each word, and the stored number for each word may be referred to as the population count or popcount of the word.

By storing the popcount for each word and implementing the rank operation, instead of having an O(n) searches—one search for each word until the last word of interest—to determine the contribution of each word, the word search is only O(1) to find the last word of interest. For example, if the buckets include 32 bit words instead of doing 32 bit searches, only one search in the last word of interest is needed, because the number of bits set to 1 and the prior words can be determined from the popcount (which has already been counted and are stored). In other words, although once the last word is found, there may still be a need for further operations to read or otherwise determine the bits set to 1 of that word, the number of operations to find the last word is O(1).

A problem may be that once the final word is reached is how to determine the number of bits set to 1 in the portion of the final word that is of interest, as in the prior example it was desirable to know rank (5053) with 32 bit words. Accordingly, the computation that may need to be done is RankBucket(5)+(popcount for words in bucket 5000 to location 5032)+?

The problem is how does one know how many bits there are set to 1 up until a location whose address ends in the middle of word. So, in the example above, how many bits are set between 32 and 53? It is desirable to have a way of computing the number of bits set to 1 from the popcount back to the original bit sequence and count the set bits.

Recall a combination is a permutation where the order does not matter. To calculate the number of combinations of way of putting n objects into k slots, the following formula may be used.

$$\text{Choose } (n, c) = n! / (n - c)! c!$$

Notice that the choose function, which may be represented with just a C(,), the same as the formula for permutations but with additional 1/c!, because there c! permutations that have same items in a different order. Based on the function choose (n, c)=n!/(n−c)!c!, mentioned above, one can define a function $$C(n, m) = \begin{cases} \dfrac{n!}{(n-m)!m!}, & n \geq m \\ 0, & n < m \end{cases}$$

(where the convention of setting 0!=1 is used). C(n,m) represents the number of ways that m items can bit into n slots (where each slot can only hold one item. Thus, if n<m, C(n,m), 0, because there are more items than slots. As an aside, some other use properties of C(n,m) are C(n,n)=1 and C(n,n−1)=n.

To create a bijection, or a bidirectional mapping between natural numbers and combinations, it is desirable to order the combinations somehow. One way to do order the combinations is to have two rules, which are:

1) the first rule is that combinations values are always in descending order. So, for example in this convention, the sequence {4,3,1} is valid, but the sequence {1,4,3} is not valid (another way of ordering the values could be chosen, such as ordering the elements of the sequence from smallest to largest instead of from largest to smallest. one of the permutation repetitions
2) The second rule is that the order of combinations is lexicographic, that is the first element in the sequence is inspected first to determine which elements are first and which are last, and then for series with the same first element, the second element is inspected, and in general first inspect earlier element in the sequence to determine that order, if the earlier element is the same, inspect the next element, to determine the order. For example, the four sequences below are in lexicographical order.

{2,1,0}, {3,1,0}, {3,2,0}, {3,2,1}

Using the lexicographic order, a value, N may be computed, where N represents the number of combinations that lexicographically precedes the corresponding sequence.

By setting N to the number of combinations that lexicographically precede the current sequence, for example, the above four sequence would map to, that is would be assigned the following four N values:

{2,1,0}<->0 combinations before it
{3,1,0}<->1 combinations before it
{3,2,0}<->2 combinations before it
{3,2,1}<->3 combinations before it The method above assignment is similar to assigning a number to each word in a dictionary. If one wanted to assign a value to the word pond, 'pond.' The first step is to find the number of words that start with letters less than 'p'. Once the number of words starting have a second letter less than 'o' and adds that to the running total of words before 'pond.' Next, adds all the words starting 'po' but have a third letter less than 'n' to the total number of word preceding pond. Finally, one adds all the word with the prefix 'pon' and letters preceding 'd.'

Symbolically, a given word may be written as a sequence $\{C_k, C_{k-1}, \ldots C_2, C_1\}$, k is the place number of the digit of the word. Since English words are arbitrary there is no computation for assigning the values to words, that can avoid counting all the words prior to the one of interest. In contrast, the combinations are not arbitrary and can be assigned values in the following manner.

$$\text{Let the sequence } C = \{Ct, Ct-1, \ldots, C2, C1\}$$

All of the combinations that share a prefix up until the symbol $C_k$ can be represented as the sequence $$C' = \{C'_t, C'_{t-1}, \ldots, C'_2, C'_1\}$$

Where $C_t' \ldots C_{k+1}' = Ct \ldots C_{K+1}$, but $C_k'$ is different than $C_K$ In other word, sequences C and C' share the same prefix, but differ at symbol $C_k$. Since the sequence C' needs to be lexicographically less than the sequence C for us to count C' as one of the sequences preceding C, it follows that $C_k' < C_k$.

Since the symbols are stored in descending order, the suffix of C' can only be chosen from the symbols 0 to $C_k'$. Also, the number of slots into which the symbols 0 to $C_k'$ may be placed is k, because the suffix of the sequence C is the slots having the systems running from $C_1$ to $C_k$. So the possible number of suffixes that may be chosen are $C(C_k, k)$.

If the formula $C(C_k, k)$ is applied to every possible prefix length, from 0 to t, the formula for N becomes, $$N = C(Ct, t) + C(Ct-1, t-1) + \ldots + C(C2, 2) + C(C1, 1)$$

Given a number N, and the number of elements in the series, the corresponding series maybe computed as follows. From above, N is equivalent to $$C(Ct, t) + C(Ct-1, t-1) + \ldots + C(C2, 2) + C(C1, 1)$$

The formula for N suggests the following.
1) For all slots there is a number represented by C(c, i) where i is the slot number, and c is the unknown value of the element that occupies that slot.
2) Since combinations are stored in descending order $C(C_i, i)$, $C(C_{i+k}, i+k)$, it must be that $C_i > C_{i+k}$, which means that the number of symbols to pick from must always be less than the number used in the previous slot.

Consequently, to turn a number N back to a sequence, one may test the first slot values in reverse lexicographical order and calculate the number of sequences including the element before the current element. Using the dictionary analogy, assuming that all combinations of four letters were words and that all words had four letters, given to compute $N_{pond}$ to find what word that corresponds to.

There is no point in computing 'z'=C(26,4), because necessarily, C(26,4) would be greater than $N_{pond}$, because the lowest possible value of $N_{pond}$ is 0, and thus the highest possible value of $N_{pond}$ is C(26,4)−1.

Next, compute 'y'=C(25, 4), and since y>p, C(25,4) would be greater than $N_{pond}$, and consequently, the first letter could not be y.

Continuing eventually, one would compute 'o'=C(15, 4), and would find that C(15, 4) was the first value that was lower than $N_{pond}$, and so since there are C(15, 4) words that begin with o or an earlier letter the first letter must be a p.

That is, all the letters above 'p' will have values greater than $N_{pond}$, and since 'p'=C(16,4) represents all of the combinations of 4 letters using any of the letters a-p, C(16,4) would include all of the p words, and thus $N_{pond} < C(16,4)$.

Since, $N_{pond} > C(15,4)$, the first letter of the corresponding word must be p. Next, C(15,4) may be subtracted from $N_{pond}$, because all of the words before the letter p have been counted. In other words, $N_{pond} = N_{ond} + C(15,4)$, where Nona is the numerical value that would be associated with the sequence of letters for the fictitious word "ond." To find the next letter, the process is repeated for Nona. However, since the words in this dictionary always have the letter that come later in the alphabet earlier in the word, the next letter must be a letter earlier in the alphabet than p. Also, now since there are only 3 letters left, the second argument in the function $C(C_k, k)$ is 3 or k is now 3. Now a search begins for all combinations of letters that will fit into 3 places having a leading letter of 'o' or less. Starting the process again, 'o'=C(5, 3) is necessarily greater than $N_{ond}$, because C(15, 3) is the total number of words that can be made with the letters a-o, but the first possible value of $N_{ond}$ is 0.

However, computing 'n'=C (14, 3) yields a number that is less than Nona, which indicates that the next letter is o. Next $N_{nd} = N_{ond} - C(14, 3)$ is computed, and $N_{nd}$ a search the next letter is performed, repeating the above process. The above process is completed until all slots are calculated.

If there are 2 bits set to 1 in a word that has 32 bits, then there are C(32,2) possible different combinations of 2 bits in a 32 bit word, and consequently there are C(n, x)=n!/(n−x)!*x!)=32!/(2!*30!)=496 different combinations.

To determine which combination is the correct combination for a given word, a natural number is mapped to each possible combination, the natural number may be called the sequence identifier or offset. The popcount, the number of possible combinations (e.g., determined by the formula for the binomial coefficient), and the sequence identifier uniquely identify the value of the word. Optionally, to save memory, the values of the binomial coefficients are not stored, but are calculated as needed and only the popcount and the sequence identifier are stored. Given the popcount, the number of possible combinations (which may be computed when needed) and the word size, one can generate the original bit sequence and therefore the bit count for any particular word.

Since the number of possible combinations is known as well, the number of possible combinations can be stored in log2 (the number of combinations) bits instead of wasting memory on a greater number of bytes, which may further improve the compression, while maintaining fast indexing. To reiterate, an index of the total rank so far is stored in buckets. The buckets allow the software to jump to a bucket without having to search through all of the entries before reaching the first entry in the bucket of interest. Then, the software can search through words quickly by adding the popcount that is explicitly stored. Once the end of the word is reached, the original bit stream can be regenerated by using the popcount and the offset with the combination mapping. In other words, the popcount and offset can help regenerate the original bit sequence of the last word, e.g.,

01001011

Having recomputed the original bit sequence of the last word, the naïve approach of literal bit counting may be used. So, the rank(5) for that bit sequence is 2, the rank of the sequence may be added to the total rank so far which is (Buckets rank)+(whole words in buckets up until last one's rank)+(the number of bits set to 1 in the word having the node between the beginning of the word and the node of interest as determined by the node number, the sequence identifier, and the popcount).

A contrived example may help in understanding how to reconstruct the bit sequence of the last word. For a word that is 3 bits long, the number of combinations can be summarized by popcount, as follows:

| Popcount | Combinations with their offset in bracket |
|---|---|
| 0 | 000 (0) |
| 1 | 001 (0), 010 (1), 100 (2) |
| 2 | 011 (0), 110 (1), 101 (2) |
| 3 | 111 (0) |

In other words,
  instead of storing 110, one can store an ordered pair of numbers, one representing the popcount and one representing the offset, such as popcount=2 and sequence identifier=1;
  instead of storing 100, one can store an ordered pair of numbers, one representing the popcount and one representing the offset, such as popcount=1 sequence identifier=2; and
  instead of storing 111, one can store an ordered pair of numbers, one representing the popcount and one representing the offset, such as Popcount=3 sequence identifier=0

The benefit is there is no need to know the original sequence. Only the total number of bits set is needed, and it is only necessary to read the popcount to know the total number of bits. Instead of counting bits, as if the bits were stored in the original sequence.

The only downside is when the last word is reached, and the rank inside the word is needed, in that case, it is necessary to regenerate the sequence as shown in the bullet point examples. Then the bits can be counted by just scanning the sequence from left to right.

The rank operation allows fast rank calculations while maintaining a compressed bit stream. The rank operation is used extensively by the succinct tree used for the IP subnet fast lookup.

For example, if the popcount is for word is 2, there are three possible bit sequences for a word with 3 bits, which are

011

101, and

110.

If the three sequences are given 3 ID numbers, such as 1, 2 and 3, then it is not necessary to store the bit sequence. Once only needs to store the sequence ID and the popcount. If the popcount is 1, then there are also three possible sequences of 3 bits, which are

001, 010, and

100.

These three sequences may also be given sequence IDs 1, 2, and 3, and then given the popcount, and the sequence number, the sequence is uniquely identified. I the popcount is 3 there is only one sequence of bits possible, and so no sequence ID is needed. Similarly, if the popcount is 0, there is only one possible sequence of bits and so no sequence ID is needed. For a three-bit word, keeping track of which sequence ID and word popcount combination corresponds to which sequence of bits may be relatively easy and may not take up much memory. However, it may be desirable to use larger words having 8 or 16 bits, for example. In general, the sequence IDs can be computed using the following conventions. Each place in the word is assigned a numerical value, starting with 0. So, the first place is 0, the second place is 1, and the third place is 2, and so on. The word may be represented by the numerical values of the places having a bit set to 1.

Thus, the word 100 would be represented by {2} and 110 would be represented by {2,1}. Similarly, the word 1101010 could be represented by {7,6,4,1}. Whether one writes {2,1} or {1,2}, it is the same word. The convention that will be followed is to always arrange the numbers representing the word in descending order. So, the word 1101010 is written as {7,6,4,1} and is not written as {1,7,4, 6}, forepresents the r example. Returning to the sequence IDs, the sequence IDs are given by the following formula, $$Seq.\ ID = C(C_k, k) + C(C_{k-1}, k-1) + \ldots + (C_2, 2) + C(C_1, 1).$$

For example, although a sequence ID is not needed for the sequence 111, the sequence 111 is represented by {2,1,0}, and the Seq. ID for {2,1,0} would be C(2,3)+C(1,2)+C(0, 1)=0.

The sequence 110 is represented by {2,1}, and the Seq. ID of {2,1}=C(2,2)+C(1,1)=1+1=2.

The sequence 101 is represented by {2,0}, and the Seq. ID of {2,0}=C(2,2)+C(0,1)=1+0=1.

The sequence 011 is represented by {1,0}, and the Seq. ID of {1,0}=C(1,2)+C(0,1)=0+0=0.

The sequence 100 is represented by {2}, and the Seq. ID of {2}=C(2,1)=2

The sequence 010 is represented by {1}, and the Seq. ID of {1}=C(1,1)=1.

The sequence 001 is represented by {0}, and the Seq. ID of {0}=C(0,1)=0.

Referring to FIG. 4A, since the first word has a popcount of 3, there is only one possible sequence of bits (which is 111), and so no sequence ID is listed (because none is needed to regenerate the sequence of bits). The second word in FIG. 4A is 110, which is represented as {2,1}, and as computed above has a sequence ID of 2, as listed in the last column of FIG. 4A. The third word in FIG. 4A is 011, which is represented as {1,0}, and as computed above has a sequence ID of 0, as listed in the last column of FIG. 4A. The fourth word in FIG. 4A is 100, which is represented as {2}, and as computed above has a sequence ID of 2, as listed in the last column of FIG. 4A. The fifth word has a popcount of zero, which also only has one possible sequence of bits (which is 000), and so no sequence ID is listed (because none is needed to regenerate the sequence of bits). The sixth word in FIG. 4A is 010, which is represented as {1}, and as computed above has a sequence ID of 1, as listed in the last column of FIG. 4A.

To navigate the succinct tree based on the word popcount and sequence ID, one needs to be able to convert a sequence ID for a particular popcount into a sequence of bits. One strategy is as follows, the number of digits in the word is given by the word popcount. Incrementing the leading digit by one, increases the order of magnitude of the bit sequence in by an order of magnitude in base 2. If there are k digits, one finds the value $C_k$ that give the highest value for $C(C_k,k)$ that is smaller than the sequence ID. For example, if the words have W bits and the word popcount is P, then the lowest value $C_k$ can have is P−1, and the highest value that $C_k$ can have is W−1. For the first digit, k=P. The value of $C_P$ is such that either $C(C_P=W-1,P)$ is less than or equal to the Seq. ID or $C(C_P,P)$ is smaller than or equal to the sequence ID, while $C(C_P+1,P)$ is less than or equal to the sequence ID or stated differently, $$C(Cp = W - 1, P) \le Seq.ID \text{ or}$$

$$C(Cp, P) \le Seq. \ ID < C(Cp + 1, P).$$

The range of possible values for the first digit is W−1 to P−1. One can perform the search by first computing C(W−1,P). If C(W−1,P) is less than or equal to the sequence ID, then the first digit is W−1 and the bit sequence can be represented by {W−1, . . . }. If C(W−1,P) is greater than the sequence ID, compute C(W−2,P) and determine whether C(W−2,P) is less than or
equal to the sequence number. If C(W−2,P) is less than or equal to the sequence ID, then W−2 is the first digit and the bit sequence can be represented by {W−2, . . . }. If not, the search continues. After the first digit is found, a search for the next digit begins.

If the first digit is F, since the largest digit comes first and since there can only be one bit in any given place of the word, the next digit must less than the first digit and can be any value from F−1 to P−2, and so one can start the search for the next digit at F−1 and compute C(F,P)+C(F−1,P−1) and determine whether that value is less than or equal to the sequence number. If it is, then the second digit is F−1, and the bit sequence can be represented by {F, F−1, . . . }. If C(F,P)+C(F−1,P−1) is greater than the sequence number, then compute C(F,P)+C(F−2,P−1) and determine whether C(F,P)+C(F−2,P−1) is less than or equal to the sequence ID. If it is, F−2 is the second digit, and the bit sequence can be represented by {F, F−2, . . . }. Otherwise, continue the search for the next digit. If the second digit is S, then start the search for the third digit with S−1 and the range of possible values for the next digit is S−1 to P−3.

So, one may try various values of Cp that setting $C_k$ to (W−1−(P−1))/2=(W−P)/2. Then, for the first digit, k=P, and so $C(C_k,k)=C((W-P)/2, P)$ and then determine whether the sequence number is smaller or greater than C((W−P)/2, P). If the value is smaller, Although with just the first three columns of FIG. 4A, there is a tremendous savings in memory, because the tree is represented as a bitmap rather than a series of pointers, it is not necessary to store every bit and adding bits to compute the rank is not the most efficient method of computing the rank.

For example, if the words have 8 digits (or W=8), the sequence ID is 16, and the popcount is 4 (or P=4), then the representation of the word has four digits, and the first digit can be anything between W−1=7 and P−1=3. Starting the search for the first digit, C(7,4)=7!/(3!4!)=7(6)5*4!/(6*4!)=35, which is greater than 16. Next computer C(6,4)=6(5)/2!=15, which is less than the sequence number. Thus, the first digit is 6, and the bit sequence can be represented by {6, . . . }. So the next digit can be any value between 5 and 2. So, computing C(6,4)+C(5,3)=15+(5*4/2!)=25, which is greater than the sequence number 16. Next, try to see if the next digit is 4, C(6,4)+C(4,3)=15+4=19, which is also greater than the sequence number 16. Next, try C(6,4)+C(3,3)=15+1=16, which is the sequence number, and so the bit sequence can be represented to {6,3 . . . }. The next digit can be any number between 3−1=2 and 1. Computing C(6,4)+C(3,3)+C(2,2)=17, which is greater than the sequence ID is 16. So, it must be that the third digit is 1. Since the third digit is 1, the last digit must be 0, and so the bit sequence can be represented by (6,3,10), which means that the bit sequence is 01001011.

Note that once the first digit is determined to be 6, and C(6,4)=15, which differs from the sequence number by 1, then one can recognize that $C(C_3,3)$ must contribute just 1, and so since C(m,m)=1, it must be that m=3=$C_3$. Then, the next two digits must contribute 0 to the sequence number, which means that $C_2<2$ and $C_1<1$, and since $C_2>C_1$, it must be that $C_2=1$ and $C_1=0$. However, the method of the prior paragraph follows an algorithm that does not require any insight into the process and is therefore easier to encode. Different search algorithms could be used. For example, each digit could be performed by a variation of Newton-Rapson search or of a bisection search, first testing a value that is halfway between the highest and lowest possible value of the digit, until one determines a value for $C_k$ such that, $$C(C_k, k) \le Seq. \ ID \text{ or}$$

$$C(C_k, k) \le Seq. \ ID < C(C_k + 1, k).$$

Returning to the example of receiving a subnet address 101, the first 1 in the subnet address 101 means that one first navigates the binary tree to the right. Using the tree of FIG. 4A, to navigate to the left from the root node, the root node always has a bit value of 1, and so one computes Rank(1)=1. Then the right child of the root node is computed as, RightChild(1)=2(1)+1=3, and so one navigates to node 3, which is still within the first word of the tree of FIG. 4A.

Next, since the current bit of the subnet address is 0, next one needs to navigate to the right. to find the rank of node 3, one reads the word popcount of the first word which is 3. A word with a popcount of three only has one possible bit sequence, which is 111, and since node 3 is the last bit of this word compute (which is the first word), the rank is the same as the word popcount or Rank(3)=3. Thus to navigate to the right from node 3, RightChild(3)=2(3)=6, and so the next node is 6.

The next digit (and the last digit) of the subnet address 101 is a 1, and so next one needs to navigate left from node 6. To compute the rank of node 6, since node 6 is the last node of the second word, the rank of node 6 is the sum of the word popcounts of first two words, which is 2+3=5. However, ignoring the fact that count of the last bit of a word is the entire word popcount, the bit sequence ID of the second word is 2, and so the representation of the word bit sequence has two digits (the word popcount value is the same as the number of digits in the representation of the bit sequence). Using the notation above, W=3 and P=2 (where W is the number of bits in the sequence and P is the word popcount), and so the first digit can have the values of W−1 to P−1, which is the values of 3−1=2 or 2−1=1, and so if the first digit is two, C(2,2)=1, which is less than the sequence value, and so the first digit must be 2. Since the next digit must be less than the current digit, the next digit can be a number W−2 to P−2, which is either a 3−2=1 or 2−2=0. Testing the higher of the two possible values first, C(2,1)+C(1,1)=1+1=2, which is the sequence ID, and so the bit sequence is represented by {2,1}, which means that the bit sequence is 110, which has two bits set to 1, and so the rank is the sum of the words up until the current word, which is 3, plus the count of the current bit within the current word, which is 2 or the rank is 2+3=5. So, to navigate to the right from node 6, Rank (6)=5, and so the right child of the $6^{th}$ node is RightChild(6)=2(5)+1=11.

Moving to the $11^{th}$ node, one determines the new subnet ID by determining the rank of node 11. Specifically, node 11 is in the second word of the second bin, and so Rank(11)=(Bin Rank)+(popcount of first word)+(bit count as determined by seq. No. and popcount of second word)=5+2+0=7. Then since each node is either a leaf or not a leaf, and since the bits set to 1 are not leafs, the new subnet ID=Node #−Rank (Node)=11−7=4. Next, the subnet ID of 4 is looked up in the Subnet ID to location index.

An Example of a Compressed Succinct Tree

Figure 4B:
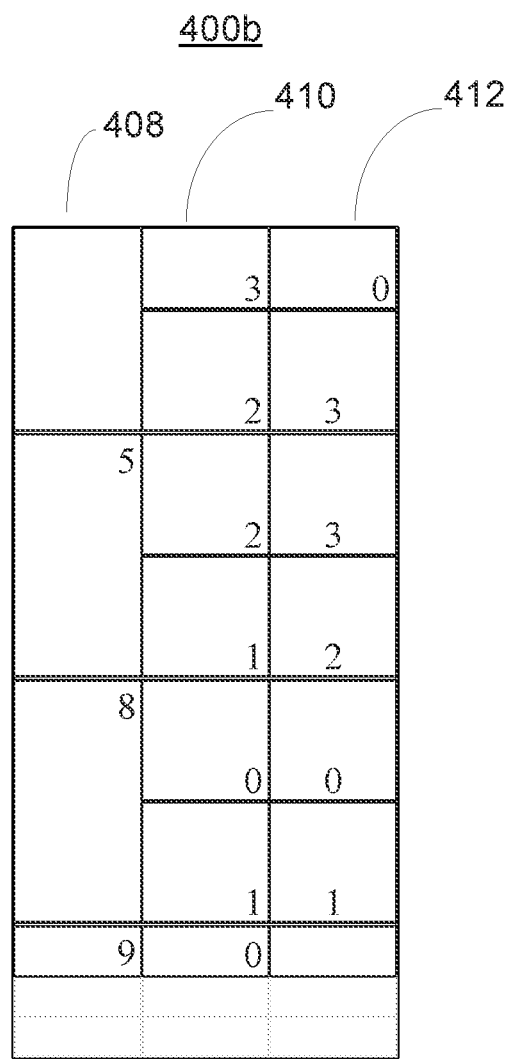
FIG. 4B shows an example of the tree of FIG. 4A, which has been further compressed, and which may also be searched efficiently while compressed.

FIG. 4B shows an example of the compressed tree 400*b* that may be saved according to one embodiment. Compressed tree 400*b* includes, bin ranks 408, word popcounts 410, and sequence IDs 412. Compressed tree 400*b* may include additional elements and/or may not include all of the components listed above.

Bin ranks 408, word popcounts 410, and sequence IDs 412 of FIG. 4B of tree 400*b* were discussed in conjunction with tree 400*a* FIG. 4A.

Unlike tree 400*a* (FIG. 4A), compressed tree 400*b* does not store the node numbers, the subnet IDs, or the individual bits, and consequently, bits 404, original subnet IDs 405, and new subnet IDs, 406 are not present in FIG. 4B. To elaborate, the node numbers are computed while traversing the tree, and which bin and word the node is in and where the memory location is where the memory location is that stores the information associated with each bin and word can be computed based on each the information about bin and word taking the same amount of memory, while the bit sequence can be determined using the word popcounts and the sequence ID, there is no need to store the actual bit sequences, node numbers or subnet identifiers, and so there is no need to store column 404,405 and 406 as part of the compressed tree, which allows the tree to be further compressed.

A Geographic Location Index

Figure 4C:
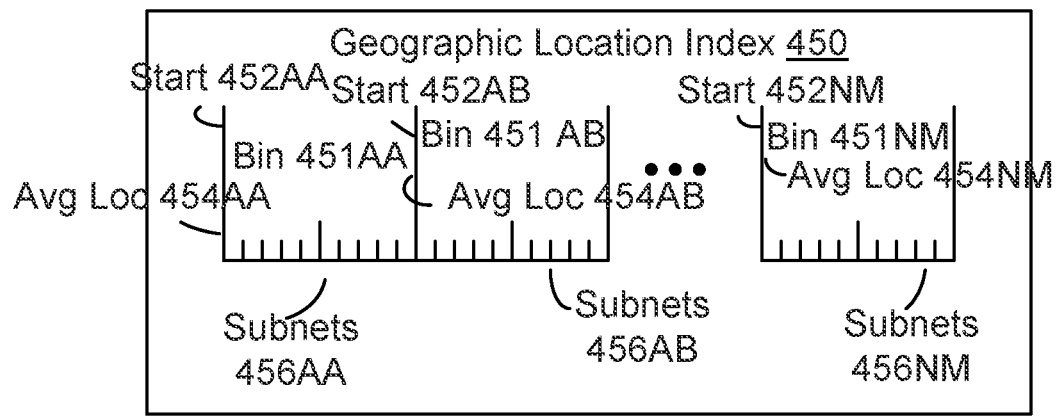
FIG. 4C is a representation of an embodiment of a geographic location index.

FIG. 4C is a representation of an embodiment of a geographic location index 450. Geographic location index 450 may include bins 451AA-451NM, start 452*a*AA-452*a*NM, avg loc 454AA-454NM. In other embodiments, geographic location index 450 may contain other information and/or columns in addition to and/or instead of that shown in FIG. 4C.

Briefly, bins 451AA-451NM each contain information about a group of subnets. The subnets are grouped together so as to decrease the search time. To find a particular subnet, one first determines which bin the subnet is in. Start 452AA-452NM are values of the subnet IDs (after being converted to the geographic index coordinates, via index 420) of the first subnet in bins 451AA-451NM, respectively. To find a particular subnet one first searches start 452AA-452NM to find a bin that has a start value that is less than or equal to the value of the subnet ID (after being converted to the geographic index coordinates, via index 420), but that has a subsequent bin that has a start value that is greater than the subnet ID of the subnet of interest. Once one finds the bin that has the subnet ID of interest, then a search is conducted within the bin found for the bin of interest. Avg loc 454AA-454NM are the average geographic coordinates of the bin of interest.

To elaborate further, in an embodiment, the GeoIdx maps integers (the input from NetIdx) to geographic coordinates efficiently in space and time. In an embodiment, all subnets within a particular geographical vicinity are given the same geographical coordinate. For example, in an embodiment, all subnets within the same 111 km vicinity are assigned the same location coordinates. Consequently, many subnets may be in the same general location geographically. For example, the geographical coordinate of a city may have significant repetition of coordinates. By using a Huffman tree (see "A method for the construction of minimum-redundancy codes" 1952)[2] within which to store the geographical location, the number of bits needed to record the labels for the geographical locations is less than were other methods used. Since the more frequently a symbol appears in the dataset, the fewer bits are used to represent that symbol, the Huffman algorithm achieves a near optimum compression. To elaborate, in a Huffman tree, coordinates that appear more frequently are encoded using fewer bits and vice versa for less frequent coordinates.

The downside of storing information in a Huffman tree (or for most compressions for that matter) is random indexing is lost. In other words, normally data is stored in bytes, so that for example if a coordinate takes up 8 bytes and if the $10^{th}$ coordinate is needed, then all that needs to do be done is to jump to the $8*10^{th}$ byte, which is the $80^{th}$ byte, read that byte, and compute the coordinate. However, with the Huffman tree, different coordinates require different numbers of bits (because the more frequent coordinates are represented by fewer bits and less frequent coordinates are represented by more bits). So, if the $10^{th}$ coordinate is desired, there is no way of knowing how many bits there are until traversing all the coordinates reading the different number of bits representing each coordinate until the end of the 9th coordinate is found. Then, after the start position of the $10^{th}$ coordinate is found, the $10^{th}$ coordinate can be read. Consequently, if asked for coordinate x, the computer would have to traverse x−1 entries to reach x. Therefore, indexing would be O(n) which is unacceptable in this context.

To compensate for encoding of the coordinates using different lengths of strings of bits for coordinate sent that occur more frequently, the coordinates corresponding to the subnets are divided into buckets of a certain size, for example 1000 sets of coordinates (corresponding to 1000 subnet IDs). In this specification, the terms bin and bucket are used interchangeably. Either term may be substituted for the other wherever the terms bin or bucket occur. Bins 451AA-451NM are examples of buckets of location to subnet index 210. Start 452AA-452NM are the starting coordinates of bins 451AA-451NM. Optionally, there may be another index that stores the starting position for each bucket (which is start 452AA-452NM). For example, if the 3030th entry is required, the software would jump to the 3rd bucket and therefore the 3000th entry. Then, within the third bucket only 30 entries need to be searched. Although the number of operations required is still in the order of O(n), the use of the buckets can reduce the number of times that the worst case, size n, occurs.

Avg loc 454AA-454NM are the averages of the coordinates of the locations in bins 451AA-451NM. Storing the location coordinates in buckets also provides an opportunity to improve compression. For each bucket the average location of all coordinates in the bucket (avg loc 454AA-454NM) is computed. Then, the coordinates of the average locations of the buckets are stored relative to the origin of the bucket. Using values taken relative to the origin of the bucket results in the coordinates of all buckets being shorter in length, because the coordinates are all relative to an origin instead of being spread out over the entire world. In other words, the values of the latitudes range between −90 and 90, and the values of the longitudes range between −180 to +180, which includes a large spread in the possible values of the coordinates. However if a group of coordinates are placed in a bucket, and the coordinates of the center of the locations stored in the buckets is computed (which is the average of all of the coordinates in the bucket), then if the coordinates within the buckets are stored in a format in which each coordinate of the bucket is relative location to the middle point, then most likely the locations will have a smaller range of values, (e.g., −30 to 30), because each coordinate is more likely to be near the middle of the bucket (and the number of locations in each bucket is fewer than the entire set of coordinates). Optionally, the coordinates chosen to be within each bucket may be chosen to be within a certain geographical region, which further increases the likelihood that the range of values of the coordinates will be less than were the buckets not used. Since the length of each coordinate is shorter, each coordinate takes up less memory (improving the compression), and may be traversed more quickly. Using location coordinates, for the buckets, that are relative to an origin, increases the frequency of coordinates of servers that are repetitious of one another (as a result of different users using the same servers). For example, if there are many more coordinates closer to the origin, coordinates of 1,1 are far more likely. The increased frequency of repeated coordinates simplifies the Huffman tree, so that the Huffman tree may require less memory to store. In another embodiment, the average coordinates of the bin maybe computed after removing outliers from the average. In another embodiment, another value other than the average coordinates may be computed and used as an offset that is subtracted from the coordinates prior to storing the coordinates that minimizes the memory required for storing the location coordinates. In practice, using the average coordinates from the buckets as the offset results in about a 10% reduction of memory.

In summary, given an integer index x from NetIdx, the bucket is found by searching for a bucket within which that index is located. For example:

$$bucket = x / \text{number of entries in the bucket}$$

Then the entry in the bucket is found by searching the entire bucket until the address is found. Then the bucket's origin is plugged in to the formula coordinate=(the bucket origin)+(the relative coordinate position with respect to the center of the bucket), which gives the coordinates of the absolute position on the globe, which is the location of the IP address.

One Bin of a Location Index

Figure 5A:
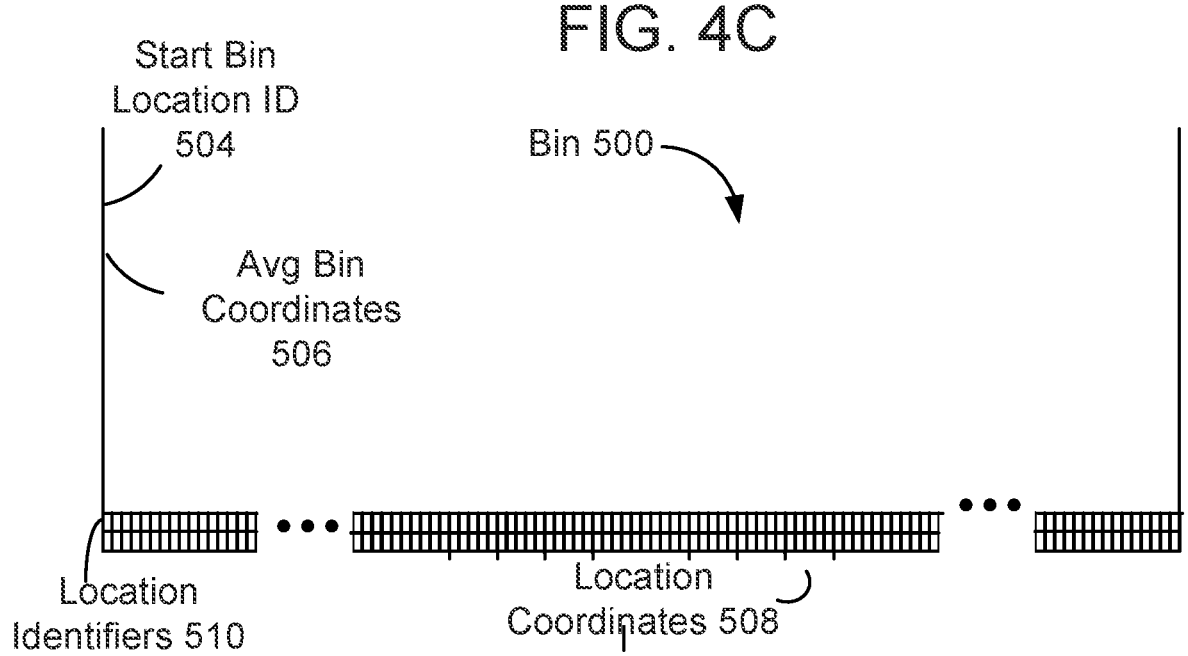
FIG. 5A shows an example of a single bin of FIG. 4C.

FIG. 5A shows an example of a single bin 500, which is an embodiment of the buckets of the Huffman tree. Bin 500 includes start bin coordinates 502, average bin coordinates 504, local bin coordinates 506, and words a-n. In other embodiments, bin 500 may include additional components and/or may not include all of the components listed above.

Start bin coordinates 502 are the coordinates of the beginning of the bin, which may be start 452AA-452NM (FIG. 4A).

Bin 500 may be any of the bins of FIG. 4A and may be any bucket of the Huffman tree. Start coordinate 502 of bin 500 is the first bit of the bin 500, which may be the start coordinates, start 452AA-452NM, that corresponds the same bin as bin 500. The rank of the location corresponding to start coordinates 502 are stored in association with the start coordinates 502, so that the rank of the bin does not need to be computed each time the rank of the location of interest is desired. Average bin coordinates 504 is the average of the global coordinates of the locations within bin 500, which may be the average coordinates, avg loc 454AA-454NM, that corresponds the same bin as bin 500. Local bin coordinates 506 are the local coordinates of bin 500. In the local coordinates of bin 500, the value of the average of the coordinates are each zero, the global coordinates of any location within bin 500 may be computed by adding the values of global coordinates of the average coordinate bin coordinates 504 to the value of the local coordinates of the location of interest that is within bin 500. The local coordinates of the locations within the bin and the global coordinates of the average location of the bin are stored rather than the global coordinates of each location in the bin to save memory. A node identifier of the node of the succinct tree of the tree index 300 is stored in association within the coordinates of each location within bin 500. Although the location of a subnet could be determined by storing location coordinates at each node of tree index 300 based on the node identifier alone, the space required would be significantly larger.

Method of Setting Up Subnet-to-Location Index

FIG. 5B(1) shows a first tree, which represents an example of an encoding of a collection of location coordinates in which location coordinates that occur more often are encoded by shorter strings of symbols, and location coordinates that occur less frequently are encoded with longer strings of symbols.

It is desirable that the geographic location index be stored in compressed manner that may be searched efficiently. The geographic location of each subnet is represented by a bit code. Regions with more Internet traffic tend to have higher populations of users and more subnets. Since the geographic coordinates are intended to represent a subnet, which includes a larger region than just one point there is no reason to store precise geographic coordinates for each subnet. For example, one the first three the geographic location coordinates may be stored or all of the geographic coordinates may be rounded off to whole integers. The result is that regions that have a lot of Internet traffic will have multiple subnets with the same geographic coordinates, and the same geographic coordinates may appear multiple times in in the geographic index. Consequently, the geographic index may be compressed by encoding geographic locations that occur more often with short bit sequences.

For example, assume that there are 13 subnets, but, at least to the precision that the geographic coordinates are recorded, there are only 4 unique pair of geographic coordinates, a, b, c, and d, which appear in the sequence, "abbbbbcdccbba." For example, perhaps the geographic locations of these four subnets are given by a=(74, −163), b=(181,0) c=(100,40), and d=(0,0). The frequency in of each symbol a, b, c, d is:

$$f[a] = 2$$
$$f[b] = 7$$
$$f[c] = 3$$
$$f[d] = 1$$

Storing a file in an uncompressed manner would represent each symbol as a fixed length binary sequence. For example:

$$a = 00$$
$$b = 01$$
$$c = 10$$
$$d = 11$$

Then a file could be represented as a sequence of binary codes so the above would be

| a | b | b | b | b | b | c | d | c | c | b | b | a |
|---|---|---|---|---|---|---|---|---|---|---|---|---|
| 00 | 01 | 01 | 01 | 01 | 01 | 10 | 11 | 10 | 10 | 01 | 01 | 00, | which uses 26 bit to encode the sequence of 13 symbols. However, if the length codes for each symbol is different, the file can be compressed by storing more frequent symbols with shorter binary codes and less frequent symbols with longer binary codes. For example, if $$a = 001$$
$$b = 1$$
$$c = 01$$
$$d = 000$$

then

| a | b | b | b | b | b | c | d | c | c | b | b | a |
|---|---|---|---|---|---|---|---|---|---|---|---|---|
| 001 | 1 | 1 | 1 | 1 | 1 | 01 | 000 | 01 | 01 | 1 | 1 | 001, | which uses 22 bits to encode the same sequence of 13 symbols.

For variable length encoding, it is desirable that the prefix of each binary representation be different from any binary representation having a different length (although binary representations of the different lengths may have the same prefix), so that a given symbol that has a given sequence of bits as a prefix is not confused with another shorter binary sequence that is the same as the prefix, and thereby simplify decoding a sequence of symbols. So as mentioned above, the sequence

| a | b | b | b | b | b | c | d | c | c | b | b | a |
|---|---|---|---|---|---|---|---|---|---|---|---|---|
| 000 | 1 | 1 | 1 | 1 | 1 | 01 | 001 | 01 | 01 | 1 | 1 | 000 | is compressed to being 22 bits long using the encoding of a=000, b=1, c=01, and d=001, whereas the uncompressed file was 26 bits long. The compression only results in a modest savings, but that is only because the example file is already small. In larger files with symbols occurring in commonly occurring frequencies, the savings are significantly greater. An encoding of symbols with higher frequencies is used to store the representations of the locations. So, instead of a long list of codes in which each symbol representing latitudes and longitudes have a fixed length, the representation of each symbol has a different length. Consequently, popular locations, such as New York will be stored in significantly fewer bits than unpopulated areas, such as Bermuda.

FIG. 5B(1) shows a tree representing the above encoding. In FIG. 5B(1), in each node are a number indicating the frequency of the symbol followed by a colon and then the symbol. Each of the children of any node sum to the frequency of the parent. The square nodes are leafs, and correspond to the actual subnets. The circular nodes are inserted, and the node identifiers are followed by an asterisk to indicate that those nodes were derived and inserted, and are not part of the original set of data. A method for constructing trees, such as in FIG. 5B(1) is illustrated in the next example.

An Embodiment of an Encoding Method

FIGS. 5B(2)-5B(5) show different steps of a method of constructing a tree that determines the subnet IDs for the subnet-to-location index for the example of FIGS. 3A-4B. Continuing with the example FIGS. 3A-4B, as shown in FIG. 5B(2), the subnets have the following frequencies,

| SUBNET ID | FREQUENCY |
|---|---|
| 1 | 1 |
| 2 | 1 |
| 3 | 1 |
| 4 | 1 |
| 5 | 6 |

FIG. 5B(2) shows step 1 of a method of encoding a collection of location coordinates of a set of subnets, which includes an initial partial tree and an initial list of identifiers of location coordinates of a set of subnets. Included in FIG. 5B(2) is the original table of the frequencies and a partial tree created from the first two elements of the table. The list of elements is sorted by frequency. To create the partial tree, the two elements having the lowest frequencies (subnet 1 and 2) are used as leaves at the bottom of the tree. A parent node 6* is created for the two leaves, and the frequency of the parent node is assigned a frequency that is the sum of the children's frequencies, 2.

FIG. 5B(3) shows the next step, step 2, of a method of encoding a collection of location coordinates of a set of subnets, which includes an updated list of frequencies and an updated partial tree created from the updated set of frequencies.

The updated table was created by removing the two elements, having the two lowest frequencies (subnets 1 and 2), which were used for creating the partial tree of step 1, and adding the new parent node to the list of frequencies at a point in the list so as to keep all of the elements of the table listed in frequency order.

As part of step 2, to create the updated partial tree of step 2, the process is repeated and the two elements with the lowest frequencies in the revised list of step 2 (elements 3 and 4) are assigned a parent having a frequency that is the sum of the frequencies of the two lowest frequency elements (resulting in the partial tree of step 2), which in this example is made of two disconnected partial trees having a parent node, 7*, that also has a frequency of 2.

FIG. 5B(4), shows step 3. Next, in step 3, the process is again repeated, and the table is again updated by removing the two lowest frequencies (subnets 3 and 4) of the table of step 2, and adding the parent node of step 2 (7*) to the table, resulting in the table of step 3. After the assigning of the two lowest of step 3 a parent (8*), the tree becomes the tree of step 3.

FIG. 5B(5) shows the next step, step 4, of a method of encoding a collection of location coordinates of a set of subnets, which includes an updated list of frequencies and an updated partial tree created from the updated set of frequencies.

FIG. 5B(6) shows the next step, step 5, of a method of encoding a collection of location coordinates of a set of subnets, which includes an updated list of frequencies and an updated partial tree created from the updated set of frequencies. After step 5, the revised list of elements will just have one element node 9*, which has a frequency of 10. However, since there is only one element in the list, that element is the root node, and the process is finished. Using the tree of step 5, each set of location coordinates can be assigned a binary code by associating a first value (e.g., 0) with a left branch and a second value (e.g., 1) with a right branch. Then for leaf, the tree is traverses from the root node to the leaf to determine the bit code that represents the subnet of that leaf.

There are other methods at arriving at the same of a similar encoding. For example, one could order all the sets of coordinates according to frequency and then starting with the most frequent set of coordinates assign it a value using as few digits as possible. However, if a prefix of a current set of bits is the same as an entire prior code for a prior set of coordinates, skip that set of bits and assign the current set of coordinates the first sequence of bits that does not have a prefix that is the same as a code that was already used to represent a prior set of coordinates. As another option, one may iteratively minimize a function, which is the sum of the products of the frequency that a particular set of coordinates occurs times the number of bits used to represent that frequency. For each bit string length (l) there are 2$^l$ possible bit strings less the number of combinations that are not available as a result of the prefixes of those combinations already being in use by shorter bit strings. For any given bit string length, the number of combinations that are not available may be computed, because each time a particular bit string of a particular length (l) is assigned as an encoding for a network coordinate, two bit strings of length (l+1) with the same prefix are now unavailable, the four bit strings of length (l+2) with the same prefix are now unavailable, and the 2$^n$ bit strings of length (l+n−1) with the same prefix are now unavailable. Also, if at length l, as a result of prior choice at shorter string lengths, currently there are m strings available, but only n was used, then at string length l+1, there will be 2*(m−n) strings available, and so at each iteration before changing the number of bit strings in use, one may need to check that the choice does not cause another choice of how many bit strings of the another length to now, to no longer be possible, and skip that choice of combination of lengths of bit strings to use. The longest string of bits that one would ever want to use has as many bits as there are elements being encoded. One may cycle through all of the possible combinations of bit lengths to use for encoding each frequency, discard those combinations that are not possible, compute the number of bits needed for each combination (by computing the sum of the products of the frequency that a particular set of coordinates occurs times the number of bits used to represent that frequency), and find the combination that uses the fewest number of bits to encode the index that associates the subnet IDs with location coordinates. After one iteratively determines how many bit strings to use for each length so as to minimize the sum of the products of the frequency that a particular set of coordinates occurs times the number of bits used to represent that frequency, the bit strings of each length may then be chosen. As long as one has a way of assigning more frequently occurring sets of coordinates codes that use fewer digits than less frequently occurring sets of coordinates, while ensuring that each set of bits does not include a prefix that is identical to a shorter length code that was already assigned to another set of coordinates, the resulting set of codes for the set of coordinates is acceptable.

An Example of an Embodiment of a Geographic Location Index

FIG. 5C(1) is an example of an index 550 that may be used for looking up the location index coordinates of a subnet of interest. Index 550 may include bins 552, subnet IDs 553, start of bin 5554, and a bit code 556. In other embodiments, index 550 may contain other information and/or columns in addition to and/or instead of that shown in FIG. 5C(1).

Index 550 is an example of a geographic index, which corresponds to the examples of FIGS. 4A, 4B, 5B(6). The combination of index 420 and geographic index 550 form an example of the identifier to location index 210, and defines an example of the mapping 214 of FIG. 2.

Bins 552 are buckets that the information stored about the subnets have been divided into. The number of subnets in each bin could be the different from other bins. Alternatively, all of the bins may have information about the same number of subnets. Using bins 552 one can first locate the bin into which the information about the subnet of interest is locations and then search within the bin found for the subnet of interest, because searching the first location-index coordinate of the bins is quicker than inspecting all the location-index coordinates in sequence until the location-index coordinate of the subnet of interest is found, which speeds up the search. In FIG. 5D, a heavy line is used to indicate the division between bins.

Subnet IDs 553 are the subnet IDs that were found using tree 400b of FIG. 4B.

Start of bins 554 is the location-index coordinate of the first subnet in each bin correlated with the information about the corresponding bin. To search for a particular subnet ID, one may first search for the bin just prior to the bin whose start of bin is greater than the subnet ID of interest, and the bin just prior to the bin whose start of bin is greater than the subnet ID of interest is the bin of interest. Alternatively, the last subnet ID of the bin may be stored/listed instead of (or even in addition to) the first subnet ID of the bin, and then one may search for the first bin that has a subnet ID whose last subnet ID is greater than the subnet if interest to find the bin having the subnet ID of interest. After finding the bin of interest, the bin is search for the subnet ID of interest.

Bit code 556 is the bit code that is used to represent the location coordinates of the subnets having the corresponding subnet ID. Bit codes 556 uses shorter sequences of bits to represent sets of coordinates that occur more frequently in index 550 and longer sequences of bits to represent sets of coordinates that occur less frequently in index 550. Additionally, the values of the bit codes have been chosen that none of the prefixes of the longer bit codes are identical to the shorter bit codes.

FIG. 5C(2) shows an index associating the bit codes of index 550 with the set of coordinates that the bit code represents. Index 550 represents (and is based on) the same encoding of the location coordinates as represented by the tree of FIG. 5B(6). Index 550 may be stored and searched as a binary tree, for example. In the fictitious example of the network of FIG. 3A, when a packet has a subnet address is received, the subnet address is read and then input into the index 400b of FIG. 4B, which yields a subnet ID. Then the subnet ID found is looked up in the index 550 of FIG. 5C(1), which yields a bit sequence representing a set of location coordinates. Then, the bit sequence found is looked up in an index represented by the tree of FIG. 4B or index 550, to determine the location coordinates of the subnet of interest.

An Example of Another Embodiment of a Geographic Location Index

FIG. 5D(1) shows index 560, which is another example of location is another example of a location index. Similar to index 550, index 560 includes location-, bins 552, subnet IDs 553, start of bins 554, bit code of location coordinates 556, bit code of avg. loc. 558. In other embodiments, index 550 may contain other information and/or columns in addition to and/or instead of that shown in FIG. 5D(1).

Similar to index 550, index 560 is an example of a geographic index, which corresponds to the examples of FIGS. 4A, 4B, 5B(6). The combination of index 420 and geographic index 550 form an example of the identifier to location index 210, and defines an example of the mapping 214 of FIG. 2. Bins 552, subnet IDs 553, and start of bins 554 were discussed in conjunction with FIG. 5C(1).

Bit code of coordinates 556 of codes representing a set of coordinates, where each set of coordinates has an offset (e.g., the average of the coordinates of that bin) subtracted from the value of the coordinates. By subtracting off the average, the value of the coordinates of the bin, magnitude of the coordinates of the subnets is smaller and therefore can be represented with fewer bits. Also, there may be fewer sets of coordinates that need to be coded, because some of the sets of coordinates with larger magnitudes may no longer be present.

Bit code of avg. loc. 558 is the bit code of the value of the average of the of the location coordinates of all the subnets of the bin. To compute the location coordinates of a give subnet, the location coordinate corresponding the bit code of the avg. loc 558 for the bin having the information about subnet is added to the location coordinates corresponding to the bit code of the location 556.

FIG. 5D(2) shows an example of an index for converting the bit codes of FIG. 5D(1) into location coordinates. The index of FIG. 5D(2) may be represented as a binary tree, for example, for a fast lookup. In FIG. 5D(2), the first four location coordinates occur more frequently (twice) than the remaining location coordinates, which only occur once. The last three location coordinates are the average location coordinate of the three bins of the index 560.

As one can see by inspecting FIG. 5D(2) and comparing the bin coordinates to the corresponding longitude and latitude of FIG. 5D(2) with the longitudes and latitude of the index of FIG. 5D(1), the magnitude of the values of the within bin longitudes and latitudes of FIG. 5D(2) tend to be smaller than the global longitudes and latitudes of the index of FIG. 5D(1), and therefore tend to require fewer bits to represent and require less memory (in practice storing the within bin coordinates leads to about a 10% further reduction in memory needed to store the geographic index). Although difficult to see without the use of hindsight, one possible reason for the savings in memory needed to store the longitude and latitude when using within bin coordinates is that even when the locations in the same bin are very far a part, such as Tokyo and New York, many of the subnets in the bin may have longitudes that are close to one another and/or many of the latitudes may have close values and therefore storing the average values for the bin as a whole and storing the within bin longitude and latitude may lead to a savings in space. Also, although it did not occur is the simple examples of this specification, in a realistic set of coordinates of subnets, as a result of the averaging, some of the larger possible magnitudes of location coordinate may not even occur, and there may be fewer sets of location coordinates in the entire set of location coordinates used to represent the subnets, allowing fewer bits to be used for representing several, possible all of the locations coordinate sets. However, use of the within-bin longitude and latitude instead of the global longitude and latitude is optional. Similarly, the use of longitude and latitude or GPS coordinates in optional any other coordinate system may be used instead.

Returning to the example of FIGS. 3, 4A, 4B, 5B and 5C, having determined that the subnet having subnet address 101 corresponds to subnet ID 4, using index 560, searching the start of bins 554, (the start location indexes of the bins), the first bin starts with location index coordinate 1 and the second bin starts with location index coordinate 3, and so location index coordinate 2 is in the first bin. Searching the first bin, subnet 4 has a bit code of 110 representing the within bin coordinates, which from index of FIG. 5D(2) has within bin coordinates of (−31, 3), while the average of the coordinates for the bin as bit code 0101, which (from FIG. 5D(2)) corresponds to the average bin coordinates of (72, −77). Adding the bin coordinates (−31, 3) to the average coordinates of the bin (72, −77), one obtains the global coordinates of (41, −74) (which is New York), which can be used to compute the distance from the router to the subnet address that sent the packet. In another embodiment, one could first assign each set of coordinates an integer value (e.g., in which the more frequently occurring set of coordinates are assigned lower values), which may be referred to as coordinate identifiers, and the use an average of values of the coordinate identifiers instead of the average bin coordinates. Then the resulting values of the coordinate identifiers may be encoded using larger bit sequences for representing the more frequently occurring coordinate identifiers and longer bit sequences for the less frequently occurring bit sequences. However, then either an index needs to stored correlating the coordinate identifiers to the location coordinates, or an algorithm needs to be stored and run for converting the coordinate identifiers to location coordinates, whereas, although in the examples given in this specification, although it may be convenient to use coordinate identifiers for the method illustrated in FIGS. 5B(2)-5B(6), after the bit code is computed for each set of coordinates, the coordinate identifiers are no longer needed, and may be discarded.

An Example of Another Embodiment of a Geographic Location Index

FIG. 5E(1) shows index 570, which is another example of location is another example of a location index. Similar to index 560, index 570 includes bins 552, subnet IDs 553, and start of bins 554. Index 570 also includes bit code of avg. lat. 572, bit code of long. 574, bit code of lat. 576, and bit code of avg. long. 578. In other embodiments, index 570 may contain other information and/or columns in addition to and/or instead of that shown in FIG. 5E(1).

Similar to index 550, index 570 is an example of a geographic index, which corresponds to the examples of FIGS. 4A, 4B, 5B(6). The combination of index 420 and geographic index 570 form an example of the identifier to location index 210, and defines an example of the mapping 214 of FIG. 2. Bins 552, subnet IDs 553, and start of bins 554 were discussed in conjunction with FIG. 5C(1).

In the example of index 570, instead of encoding each set of location coordinates (e.g., each having a longitude and latitude) as one number, each number was given a separate bit value.

Bit code of avg. lat. 572 contains the bit code for the average of the latitudes of the bin. Bit code of long. 574 contains the bit code for the average of the longitudes of the bin. Bit code of lat. 576 contains the bit code of the latitudes of the bin. Bit code of long contains the bit code the longitudes of the bin. Each of the values in bit code of avg. lat. 572, bit code of long. 574, bit code of lat. 576, and bit code of avg. long. 578 have been encoded such that values that occur more frequently require fewer bits.

FIG. 5E(2) shows an example of an index for converting the bit codes of FIG. 5E(1) into numerical values. The index of FIG. 5E(2) may be represented as a binary tree, for example, for a fast lookup. The left column list the bit codes used in index 570 and the right column includes the corresponding numerical values. Once one has located a particular bit value for latitude or longitude of a particular subnet or of a particular bin of index 570, the bit code is looked up in the index of FIG. 5E(2).

Method of Blocking Undesirable Packets

Figure 6:
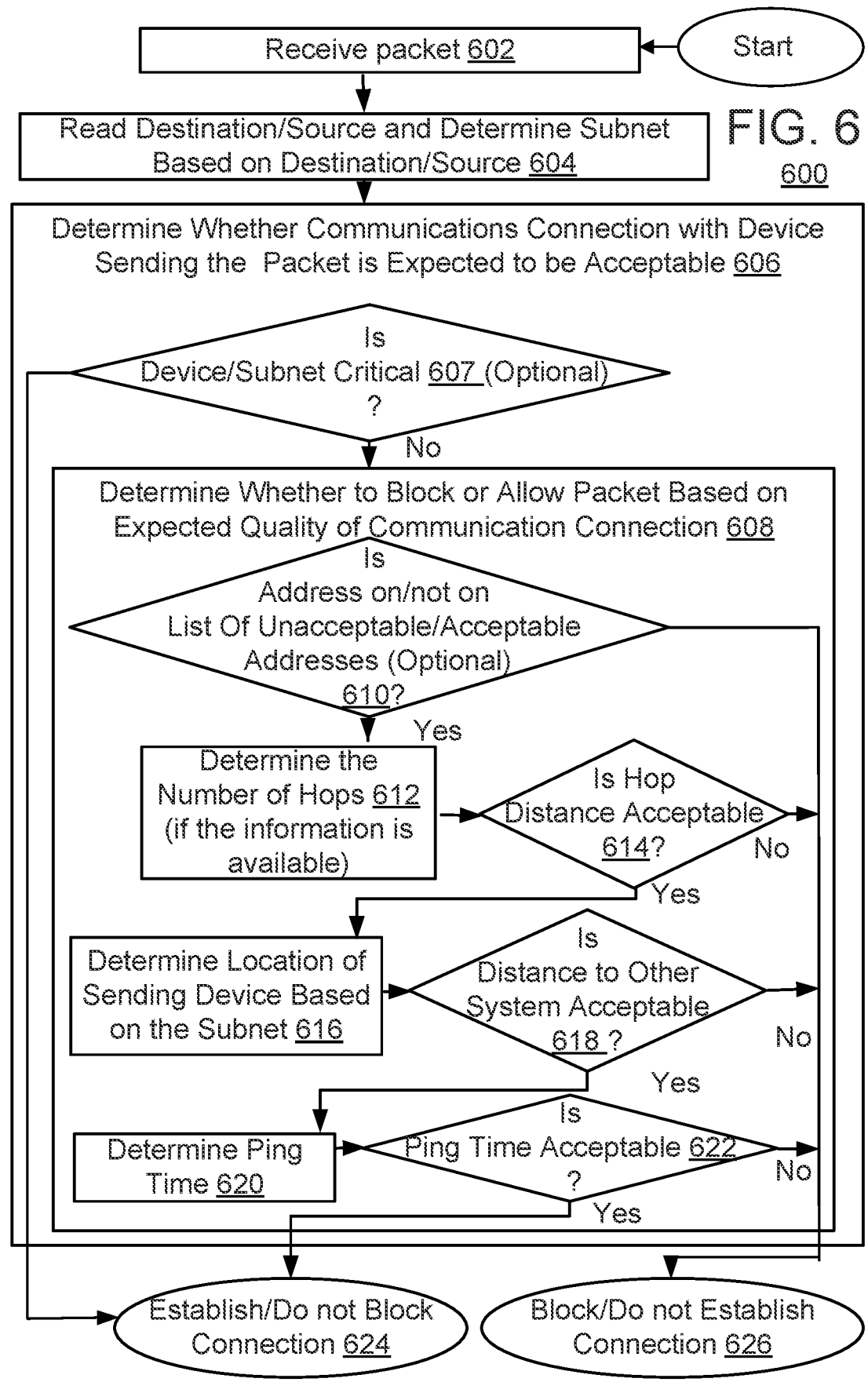
FIG. 6 is a flowchart of an embodiment of a method of selecting and/or blocking a connection.

FIG. 6 is an embodiment of a method 600 of selecting and/or blocking a connection. Method 600 blocks a connection by blocking packets originating from a device the user or server does not want to connect to. In step 602, a first packet is received from a device. In step 604, the source and/or destination of the packet is read, and based on the source or destination of the packet, the subnet is determined. The subnet may be determined by reading the first part of the network address, which may be used as the subnet address. In step 606, a determination is made as to whether communications with the device is expected to be desirable. The determination may be made by determining whether the packet meets one or more criteria. In optional step 607, a determination is made whether the subnet or address is one that is critical to perform the desired tasks (e.g., playing a game). For example, the packet may originate from or destined to the server of the host of the game. Possibly (e.g., to save the time of reading the entire address), any packet from or to subnet of a server (or other network device or resource) that is critical to the task is automatically accepted. There may be a whitelist of subnets and/or addresses from which packets are always accepted. If the packet is determined not to be on the whitelist, the method proceeds to step 608 of step 606. Step 608, which involves determining an expected quality of the connection. Step 608 may include an optional step 610.

In step 610, a list of subnets an/d or specific addresses, such as servers recommended by the service provider and/or a list of servers and/or subnets known to be problematic are checked to determine whether to allow or block the packets. For example, the router may store a list of blacklisted subnets (and/or specific network addresses), which is list of subnets to always block. Alternatively, or additionally, there may be a list of whitelisted subnets (and/or specific network addresses), and only those subnets or range of subnets are accepted. Alternatively, step 610 may be performed by the console rather than the by router or may not be performed at all. If the packet is from or destined to a recommended server (or other device address, or subnet) or to a server that is not specifically unrecommended (or other device address, or subnet), method 600 continues with step 612.

In step 612, the hop count of the signal is determined (if the hop count can be determined). If the hop distance is determinable, in step 614, a determination is made as to whether the hop distance is acceptable. If the hop count is acceptable, the method continues to step 616. In step 616, a determination is made of the location of the device that sent the packet. In step 618, a determination is made as to whether the geographical location is an acceptable location. The determination may be made based on how far away the location is, by whether the connections is from the area in the past have been good, and/or by whether the location has a good network. In step 620, if the location is acceptable, a determination is made for the ping time. In step 622, if the ping time is acceptable, the method proceeds to step 624. Similarly, retuning to step 607, is the packet is determined come from a critical device, server, network resource, network address, or subnet, the method proceeds to step 624, and in step 624, the packet is allowed to pass. On the other hand, if in step 610 it is determined that the server is not on the recommended list or is on a list of unrecommended devices, servers, addresses, subnets, if in step 614 it is determined that hop distance is too long, if it is determined in step 618 that the location of the device that sent the packet came from, or is destined to, an acceptable location, or if it is determined in step 622 that the ping time is not acceptable, the method proceeds to step 626. In step 624, the packet is rejected.

In an embodiment, each of the steps of method 600 is a distinct step. In another embodiment, although depicted as distinct steps in FIG. 6, step 602-620 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Method for Navigating Compressed Succint Tree

FIG. 7 is an example of the method 700 of converting a subnet address into a subnet identifier. In order to implement step 616 of method 600 (FIG. 6), it may be desirable to convert the subnet address into a location. To convert the subnet address into a location, first the subnet address is converted into a subnet identifier. To convert the subnet address into a subnet identifier, in may be desirable to navigate a compressed succinct tree. Method 700 involves navigating a compressed succinct tree.

In step 702, the root node of the compressed succinct tree is traversed, the next node is chosen based on the first digit of the subnet address. In step 704, a determination is made whether the current node has children or whether the last digit of the subnet address has been reached. If the current node has children or if the end of the subnet address has been reached, the method 700 proceeds to step 706. In step 706, if the nodes traversed match the subnet address, the subnet ID of the subnet that has been reached may computed, by subtracting the Rank of the node from the node number, which is the identifier of the subnet.

Returning to step 704, if the nodes traversed do not yet match the subnet address or if there are still more digits to the subnet address, the method 700 proceeds to step 710, where a determination of which branch of the binary tree that is represented by the compressed succinct tree to follow. Next in step 712, the node at the branch that was determined in step 710 is traversed. In order to perform step 712, first sub-step 714 is performed in which information about the current node is determined. For example, the rank of the current node is determined in order to traverse to the node of one of the two children of the current node. Next, in sub-step 716 of step 712, the node number of the next node is computed, and after sub-step 716 and after step 712, the method returns to step 704, where a determination is made as to whether nodes traversed correspond to subnet of the packet received, restarting the loop of method 700.

In an embodiment, each of the steps of method 700 is a distinct step. In another embodiment, although depicted as distinct steps in FIG. 7, step 702-716 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

Method for Computing Rank of Current Node

Figure 8A:
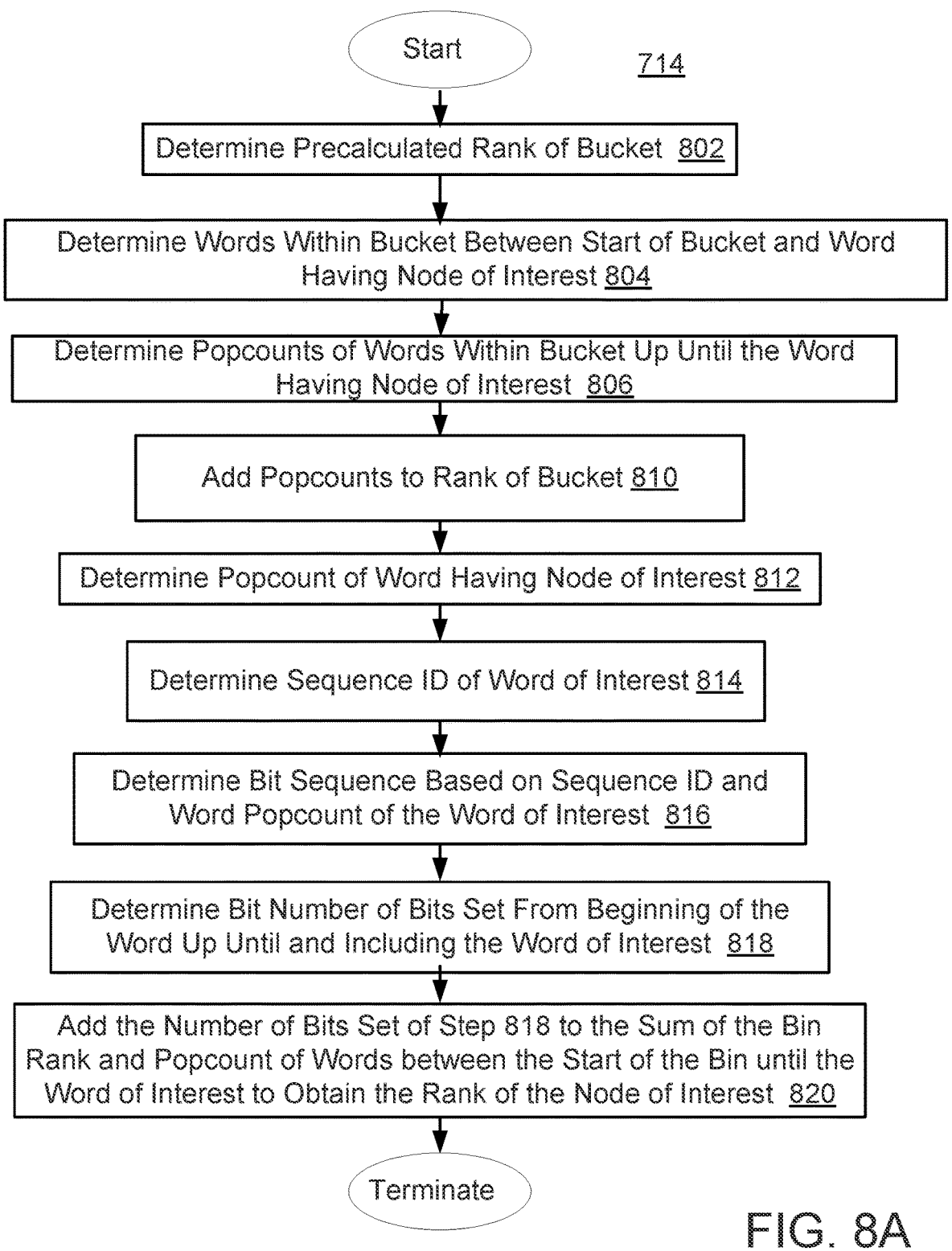
FIG. 8A shows a flowchart of an example of a method for implementing one of the steps of FIG. 7.

FIG. 8A is an example of a method for implement step 714 of method 700 or FIG. 7 in which information about the node is determined. For example, in step 714, the rank of the nodes is computed so that the node number of at least on the children of the current node may be determined.

In step 802, the pre-calculated rank of the current bucket is read. In step 804, the words between the beginning of the bin and the word having the current node does are determined. Next, in step 806, the popcounts of the words between the beginning of the bin and the word having the current node are determined, such as be reading the save values representing the popcounts. Next, in step 810, the popcounts of the words between the beginning of the bin and the word having the current node are added to the rank of the bin. Next, in step 812, the pop count of the word having the node of interest is looked up. Then, in step 814, the sequence ID of the word having the node is determined (e.g., read or retrieved). In step 816, a determination of the bit sequence of the word of interest is determined, based on the popcount and the sequence ID. Then, in step 818, the bits from the beginning of the word up until and including the node of interest are added together. Then, in step 820, the sum of the bits from the beginning of the word up until and including the node of interest are added to the sum of the rank and pop counts of the prior word of the bin to arrive at the rank of the node.

In an embodiment, each of the steps of method 800 is a distinct step. In another embodiment, although depicted as distinct steps in FIG. 8, step 802-820 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Method of Determining Next Node to Traverse

Figure 8B:
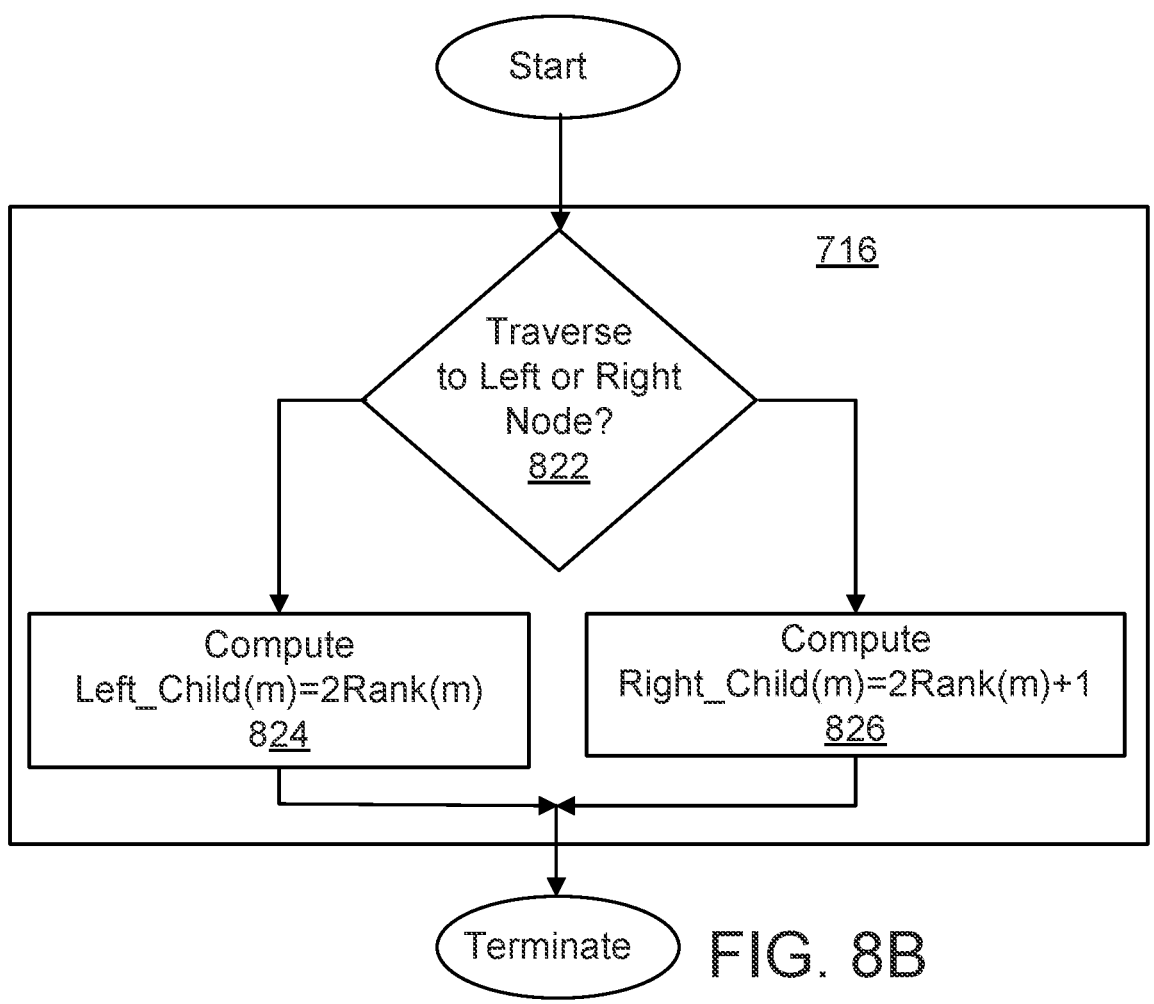
FIG. 8B shows a flowchart of an example of a method for implementing one of the steps of FIG. 7.

FIG. 8B shows an example of a method for implementing step 716 of method 700 (FIG. 7). In step 822, a determination of whether to traverse to the right child of the current node or the left child of the current node. For example, if the next digit in the subnet address is 1 the method traverses to the left child of the current node and the method proceeds to step 824. At step 824, the formula LeftChild(m)=2Rank(m) is computed. Returning to step 822, if the next digit of the subnet address is a 0, the method traverses to the right child of the current node, and the method proceeds to step 826. At step 826, the formula RightChild(m)=2Rank(m)+1 is computed.

In an embodiment, each of the steps of method of step 714 is a distinct step. In another embodiment, although depicted as distinct steps in FIG. 8, step 822-826 may not be distinct steps. In other embodiments, the method implementing of the step 714 may not have all of the above steps and/or may have other steps in addition to or instead of those listed above. The steps of method of implementing step 714 may be performed in another order. Subsets of the steps listed above as part of method of implementing step 714 may be used to form their own method.

Method of Determining Bit Sequence of Current Word

Figure 8C:
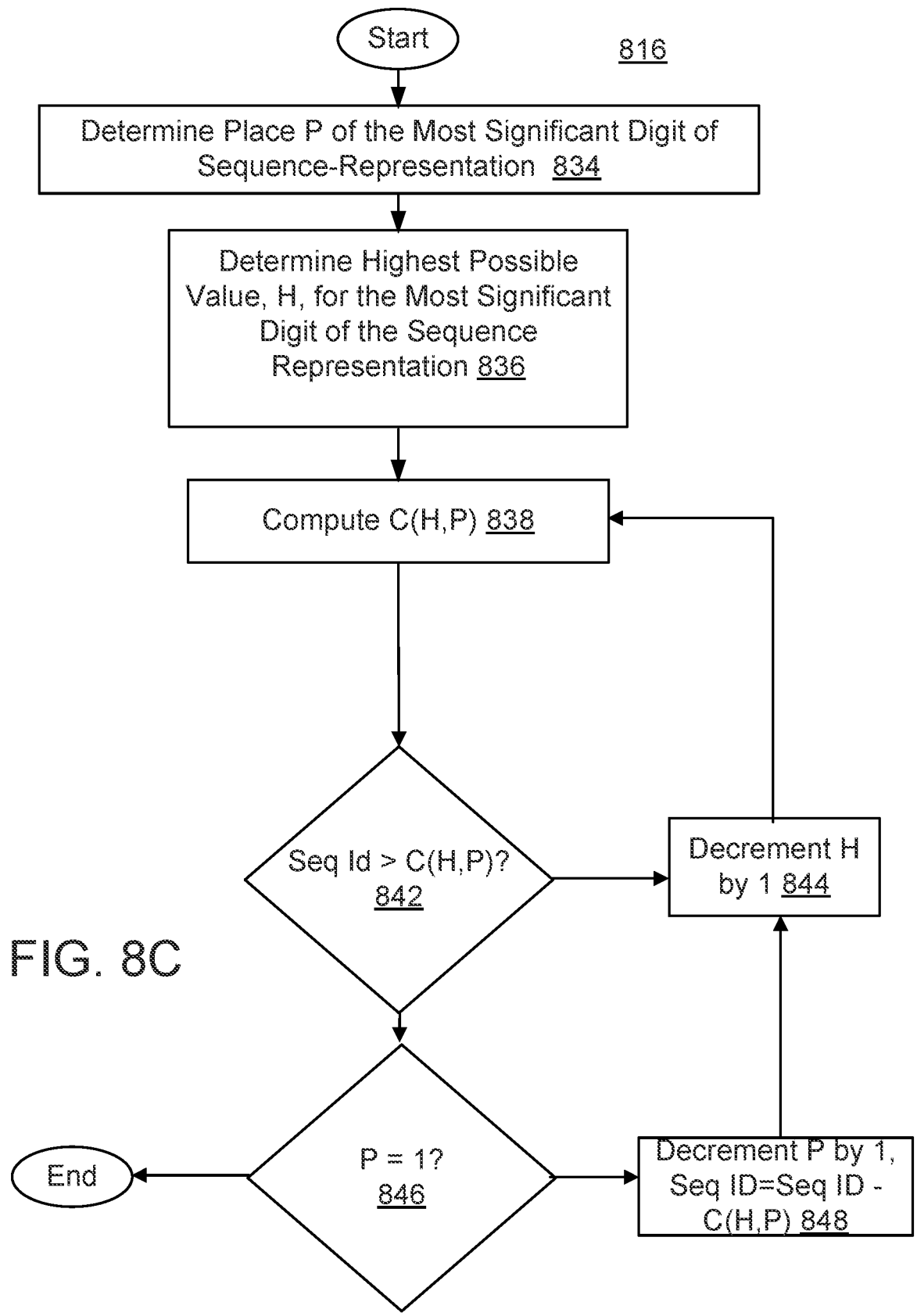
FIG. 8C shows a flowchart of an embodiment of a method of implementing one of the steps of FIG. 7.

FIG. 8C shows an embodiment of method for implementing step 816 (FIG. 8A) of the method for implement step 714 of method 700 (FIG. 7). In optional step 834, a determination of the place P of the most significant digit of the representation of the bit sequence is the determined, based on the popcount of the word. For example, P=the popcount of the current word (step 834 is optional because the popcount may be used as the value of the highest possible place without expressly setting the P to the popcount, and the popcount may be retrieved before step 716). In optional step 836, the highest possible value H of the most significant digit is determined. For example, H may be set to the number of digits in the word minus 1 is the highest possible value for the first digit of the representation of the bit sequence. However, the number of bits in each word is already known and therefore may not need to be expressly determined each time method 716 is implemented. In step 838, C(H,P) is computed. In step 842, a determination is made whether Seq. ID is greater or smaller than C(H,P). If the Seq. ID is smaller than C(H,P), then the leading digit has not been found and, ins step 844, H is decremented by 1 or H=H−1, and the method returns to step 838 to determine the value of the current digit. Returning to step 842, if the Seq. ID is greater than or equal to C(H,P), then the value of the current digit is H, and the method proceeds to step 846, if P=1, then all the elements of the representation of the bit sequence has been determined and step 716 concludes. If P is greater than 1, then the method proceeds to step 848, where the Seq. ID is decremented by C(H,P) or Seq. ID=Seq. ID—C(H,P), and then P is decremented by 1 or P=P−1 is computed. After step 848, the method proceeds to step 844, where H is replaced with H−1, and the search of the next most significant digit of the representation of the bit sequence is started.

In an embodiment, each of the steps of method of step 716 is a distinct step. In another embodiment, although depicted as distinct steps in FIG. 8, step 834-848 may not be distinct steps. In other embodiments, the method implementing of the step 816 may not have all of the above steps and/or may have other steps in addition to or instead of those listed above. The steps of method of implementing step 816 may be performed in another order. Subsets of the steps listed above as part of method of implementing step 816 may be used to form their own method.

Method for Implementing a Sub Net to Location Index

Figure 8D:
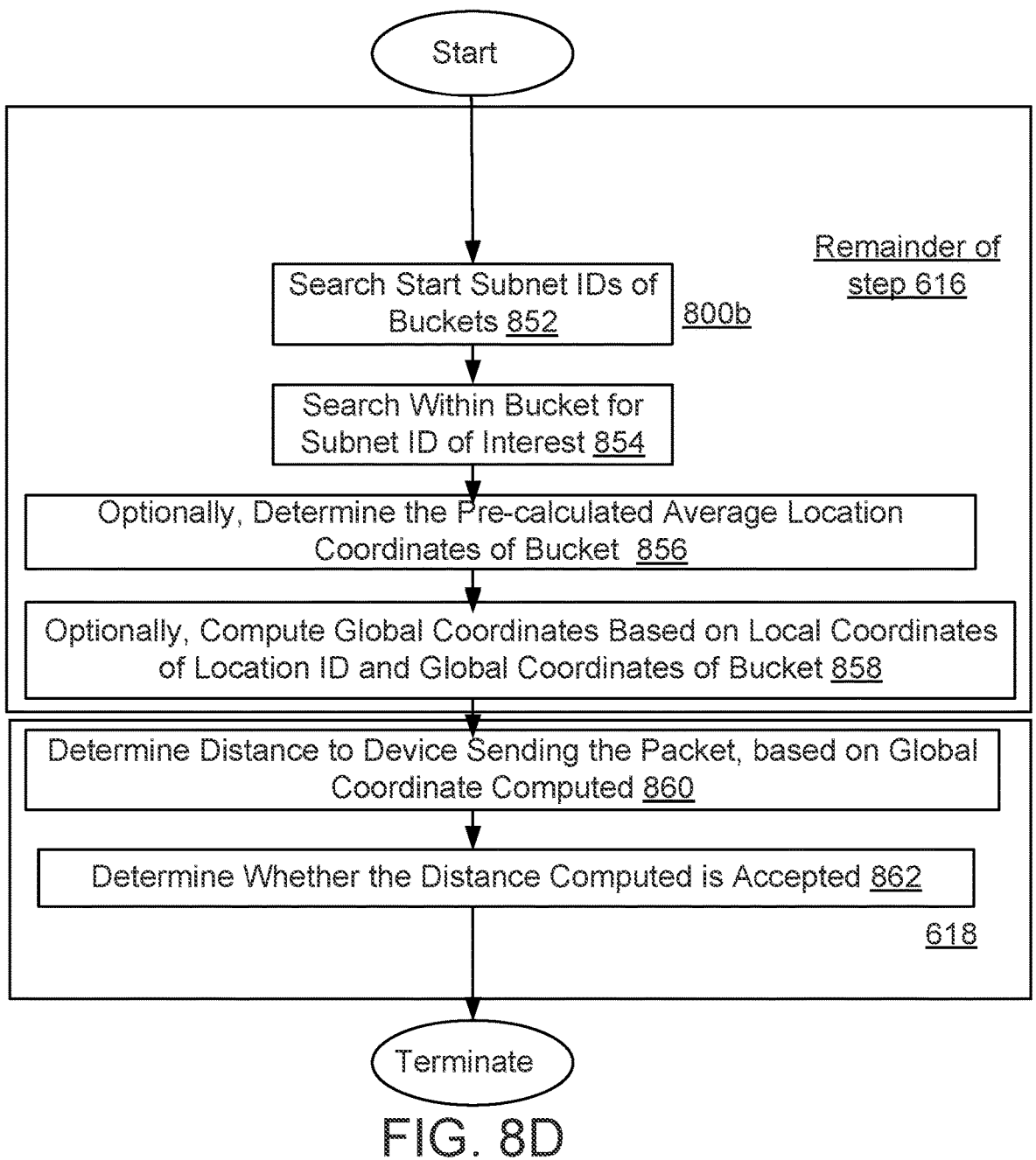
FIG. 8D is a flowchart of an embodiment of a method of implementing two of the steps of FIG. 6.

FIG. 8D is a method of implementing part of step 616 and step 618 of method 600. The method of FIG. 8D is an embodiment of a method of implementing the identifier to location index 210 and/or mapping 216 (FIG. 2).

In step 851, the geographic index coordinates (that is, the subnet IDs used by the location index) are determined based on the subnet ID found in the binary tree, such as by looking up the subnet IDs in an index such as the index 400b of FIG. 4B. In step 852, the subnet IDs of start the bins of the location index are searched until the bin having the subnet ID of interest are found. In step 854, the subnet IDs in the bin of interest are searched until the subnet of interest is found. In step 856, optionally, the bit code for the average geographic coordinates of the bin of interest are retrieved, and then the average geographic coordinates of the subnets of the bin are determined (e.g., looked up in an index or tree, such as a binary tree) based on the bit code retrieved. In step 858, the global location coordinates of the subnet of interest are determined. In step 858, the bit code for the coordinates of the subnet of interest are retrieved and the geographic coordinates of the subnet are determined (e.g., looked up in an index or tree, such as a binary tree) based on the bit code retrieved. In an embodiment in which the geographic coordinates retrieved based on the bit code retrieved are the global coordinates, step 858 if complete. In an embodiment in which the geographic coordinates of the subnet of interest are the local bin coordinates (the global geographic coordinates minus the average of the location coordinates of the subnets of the bin), the global location coordinates are computed from the average location geographic coordinates of the bin and within-bin location coordinate associated with the geographic index coordinates of the subnet of interest, such as by adding average location coordinates of the bin to the within-bin location coordinate of the subnet ID (the average location coordinates of the bin may be replaced with another offset). In step 860, the distance from the router to the subnet of interest is determined. In step 862 (or step 618 of method 600 of FIG. 6), a determination of whether the distance is acceptable is made. For the example, a determination is made whether the distance is larger than a threshold distance.

In an embodiment, each of the steps of method of steps 616 and 618 are distinct steps. In another embodiment, although depicted as distinct steps in FIG. 8, step 851-862 may not be distinct steps. In other embodiments, the method implementing of the steps 616 and 618 may not have all of the above steps and/or may have other steps in addition to or instead of those listed above. The steps of method of implementing steps 616 and 618 may be performed in another order. Subsets of the steps listed above as part of method of implementing step 616 and 618 may be used to form their own method.

An Example of Hardware for Implementing the Method of this Specification

Figure 9:
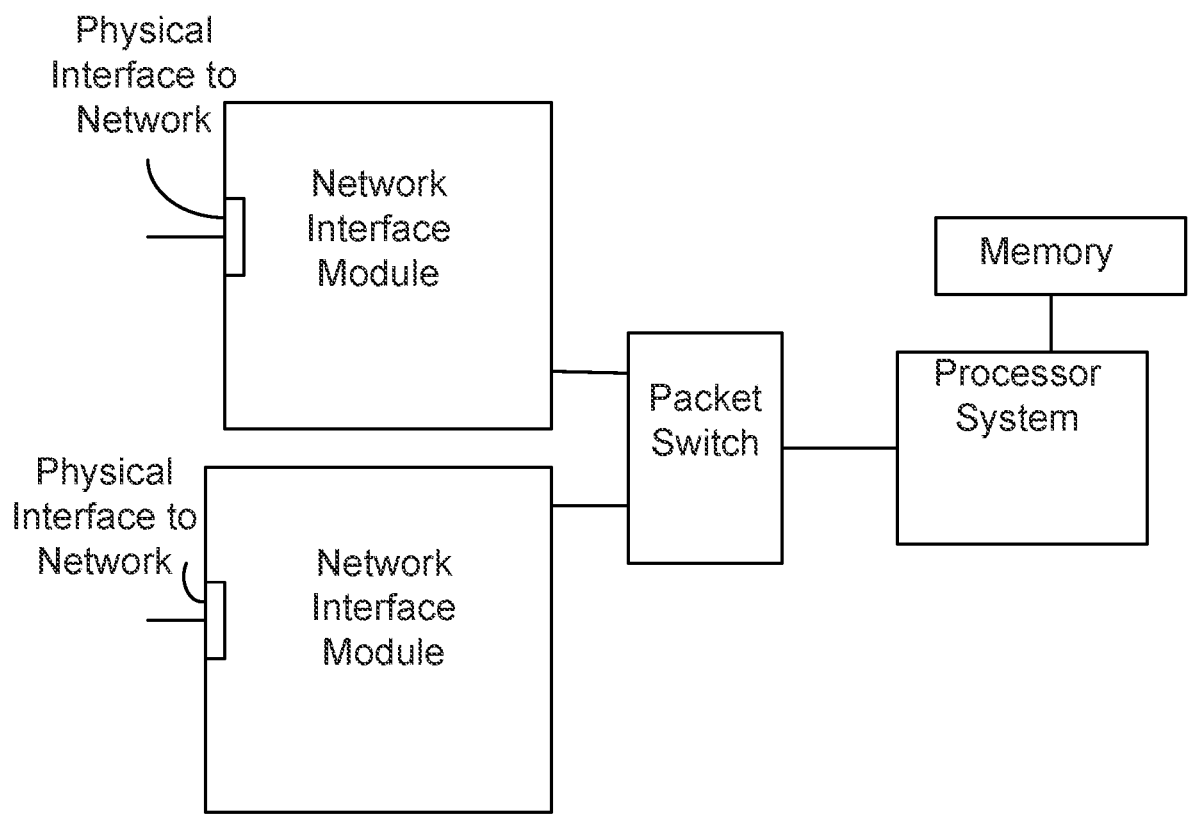
FIG. 9 shows a block diagram of an example of a router.

FIG. 9 shows an example of a router 900. The router may include one or more network interface modules, an optional packet switch, a processor system, and memory. In other embodiments, router 900 may include additional components and/or may not include all of the components listed above.

The network interface modules may include a physical interface to a network, such as the Internet. The network interface module may be a network card or other network interface module with similar functions. The network interface module processes incoming packets, determines where to send the incoming packets and forwards the incoming packets to the optional packet switch. The network interface module also receives packets from the optional packet switch and forwards the packets to another device in the network.

The optional packet switch (which is optional) connects the network interfaces to one another and to the processor. Packets travel from one network interface module to the optional packet switch. Packets in the optional packet switch may travel from the optional packet switch to the processor, to a different network interface module, or back to the same network interface. The optional packet switch may be a hardware switch or may be a shared memory. If the optional packet switch is a shared memory, the packets may be sent to the optional packet switch and retrieved from the optional packet switch rather than the optional packet switch sending packets to other components.

The processor receives packets from the optional packet switch, determines the next destination for the packets, and then returns the packets to the optional packet switch to be forwarded to a network interface module. When a group of packets originate from the same source that are headed for the same destination, one packet from the group may be processed by the processor, and the remaining packets may be processed by the network interface without being sent to the processor, and the network interface module is configured to determine how to process other packets of the group based on the packet from the group that was processed by the processor. The processor system may include one or more processors. The processor system may include an interface to a console, such as personal computer or game console.

The memory system may store information and instructions related for implementing protocols that determine whether to allow a packet to pass from one network and/or device to another and/or what device in the network to forward the packet (e.g., based on hop distance). The algorithm for filter out packets from locations that are likely not to have a good connection and the compression algorithm may be sent, via an interface to the memory system accessible by a console, which may be run by the processor system of the router.

Figure 10:
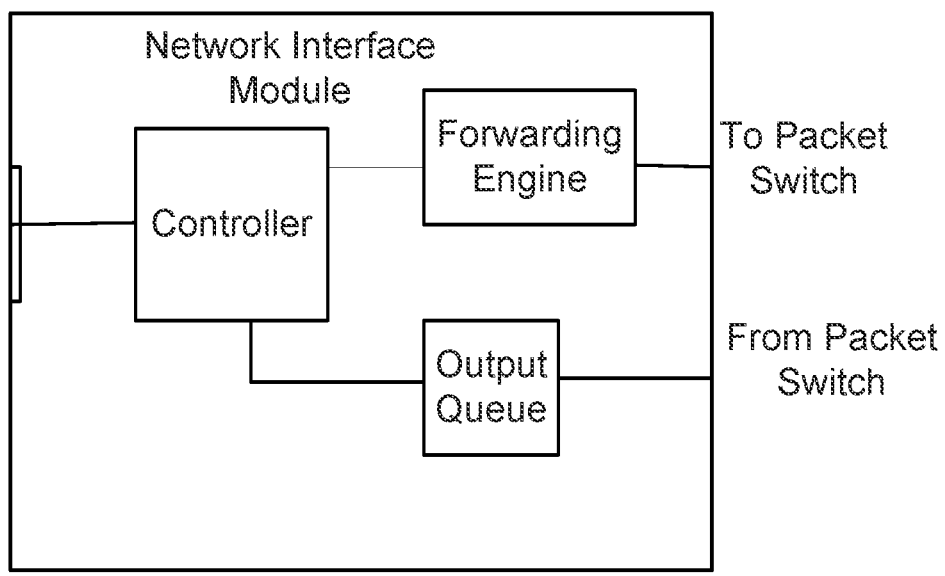
FIG. 10 shows an example of network interface module in the router of FIG. 9.

FIG. 10 shows an example of a network interface module 1000. The network interface module may include a controller, a forwarding engine, and an output queue. In other embodiments, network interface module 1000 may include additional components and/or may not include all of the components listed above.

The forwarding engine determines where to forward the packets, and then sends the packet to the optional packet switch, where the packets are forwarded to the destination determined by the forwarding engine. The output queue is a queue of packets from the optional packet switch, which are waiting to be sent by the controller to the next device in the network. The controller controls the forwarding engine and output queue. The controller may have a memory for storing addresses of devices.

Figure 11:
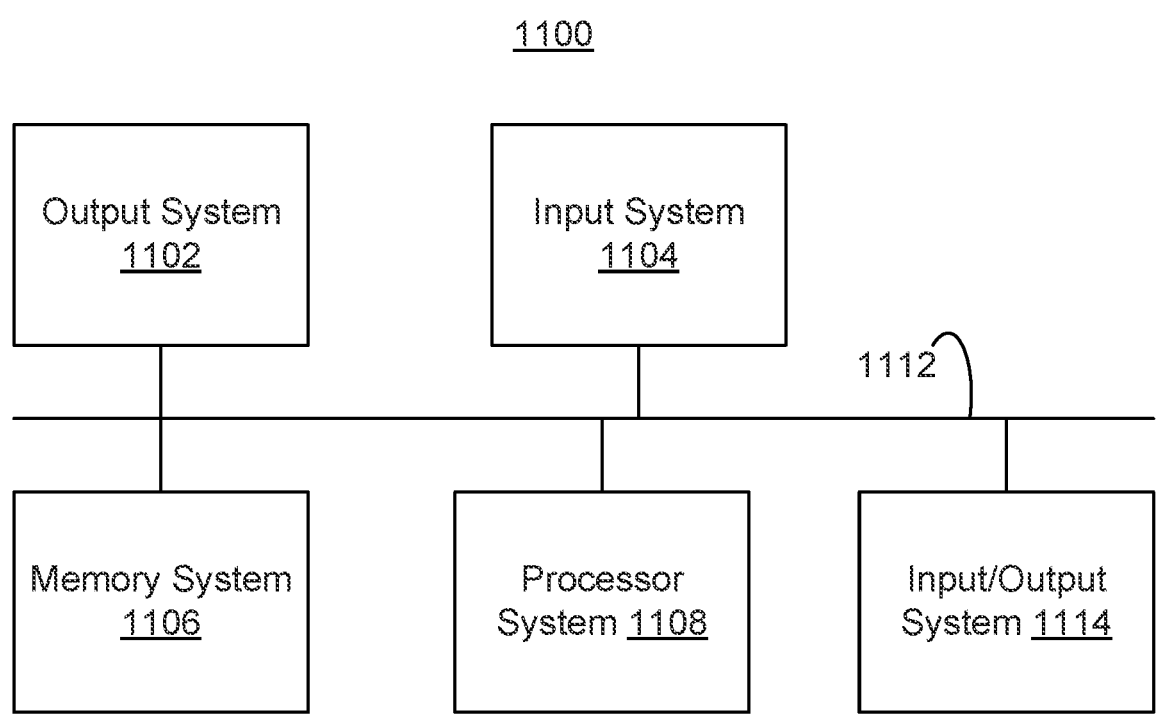
FIG. 11 shows a block diagram of a console used in the system of FIG. 1

FIG. 11 shows a block diagram of a console 1100 used in the system of FIG. 1.

The console 1100 may include output system 1102, input system 1104, memory system 1106, processor system 1108, communications system 1112, and input/output device 1114. In other embodiments, console 1100 may include additional components and/or may not include all of the components listed above.

Console 1100 is an example of system that may be used for a server or a user system. The user system may be a laptop, tablet, personal computer, mobile phone, server, game console and/or other computing device.

Output system 1102 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. Output system 1102 may send communications, via the router, to other systems connected to the network.

Input system 1104 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 1104 may receive communications, via the router, from other systems connected to the network.

Memory system 1106 may include, for example, any one of, some of, any combination of, or all of a long term storage system, such as a hard drive; a short term storage system, such as random access memory; a removable storage system, such as a floppy drive or a removable drive; and/or flash memory. Memory system 1106 may include one or more machine readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. Memory system 1106 may store a browser and/or other interface for communication with the router.

Processor system 1108 may include any one of, some of, any combination of, or all of multiple parallel processors, a single processor, a system of processors having one or more central processors and/or one or more specialized processors dedicated to specific tasks. Also, processor system 1108 may include one or more Digital Signal Processors (DSPs) in addition to or in place of one or more Central Processing Units (CPUs) and/or may have one or more digital signal processing programs that run on one or more CPU.

Communications system 1112 communicatively links output system 1102, input system 1104, memory system 1106, processor system 1108, and/or input/output system 1114 to each other. Communications system 1112 may include any one of, some of, any combination of, or all of electrical cables, fiber optic cables, and/or means of sending signals through air or water (e.g., wireless communications), or the like. Some examples of means of sending signals through air and/or water include systems for transmitting electromagnetic waves such as infrared and/or radio waves and/or systems for sending sound waves.

Input/output system 1114 may include devices that have the dual function as input and output devices. For example, input/output system 1114 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 1114 is optional and may be used in addition to or in place of output system 1102 and/or input device 1104. Input/output system may handle communications with other system in the network, via the router.

EXAMPLES OF EMBODIMENTS

Embodiment 1. A system comprising:
a processor system including one or more processors, and
a memory system, the memory system storing one or more machine instructions, which when implement cause the processor system to implement a method including at least
determining by a machine of the system whether a packet is from a location that meets one or more predetermined criteria, the one or more predetermined criteria being indicative of whether an acceptable connection quality is obtainable;
if the determining determines that the one or more predetermined criteria are not met, blocking by the machine, the packet; and
if the determining determines that one or more predetermined criteria are met, processing by the machine, the packet;
the determining of whether the one or more predetermined criteria are met including at least determining, by the machine, whether the packet originated from a location that is within a particular predefined vicinity of a destination, if the packet originated from within the particular predefined vicinity of the destination, at least one of the one or more predetermined criteria are met, and unless there is another of the one or more predetermined criteria that is not met, the packet is allowed to pass, by the machine; and
if the packet originated from outside of the particular predefined vicinity of the destination, the one or more predetermined criteria are not met, and the packet is blocked by the machine.
Embodiment 2. A system comprising:
a processor system including one or more processors, and
a memory system, the memory system storing one or more machine instructions, which when implement cause the processor system to implement a method including at least
searching, by the system, for a host that hosts a given service;
determining, by a first machine, whether a packet, from a second machine, is from a location that meets one or more predetermined criteria, the one or more predetermined criteria being indicative of whether an acceptable connection quality is obtainable, the first machine having a processor system including one or more processors and a memory system;
if the determining determines that the one or more predetermined criteria are not met, blocking by the first machine, the packet;

if the determining determines that one or more predetermined criteria are met, processing by the first machine, the packet;

the determining of whether the one or more predetermined criteria are met including at least determining, by the first machine, whether the packet originated from a location that is within a particular predefined vicinity, if the packet originated from within the particular predefined vicinity, at least one of the one or more predetermined criteria are met, and unless there is another of the one or more predetermined criteria that is not met, the packet is allowed to pass, by the first machine; and if the packet originated from outside of the particular predefined vicinity, the one or more predetermined criteria are not met, and the packet is blocked by the first machine, as a result of the packet being blocked, the second machine ceasing to send packets to the first machine.

Embodiment 3. The system of any of embodiments 1-19 or 1, wherein the determining of whether the criterion is met including at least determining whether, by the machine, a ping time is less than a given threshold;

if the ping time is less than the threshold, at least one of the one or more predetermined criteria are met, and unless there is another of the one or more predetermined criteria are met, and unless there is another of the one or more predetermined criteria that is not met, the packet is allowed to pass, by the machine; and if the ping time is greater than the threshold, at least one of the one or more predetermined criteria is not met, and the packet is blocked by the machine.

Embodiment 4. The system of any of embodiments 1-19 or 1, the system being a router.

Embodiment 5. The system of any of embodiments 1-19 or 1, the system being a server.

Embodiment 6. The system of any of embodiments 1-19 or 5, the server being a host of an online game.

Embodiment 7. A system of any of embodiments 1-19 or 1, the method further comprising preventing, by the system, a user that is outside of the predefined vicinity from joining a game by at least performing the method.

Embodiment 8. The system of any of embodiments 1-19 or 1, the determining of whether the packet originated from the location that is within the particular predefined vicinity including at least determining a location associated with a subnet by at least determining, by the machine, a subnet identifier from an index that stores an association between the subnet addresses and subnet identifiers, and determining, by the machine, a location based on the subnet identifier from an index that stores an association of subnet identifiers with locations;

the index that stores the association between the subnet addresses and the subnet identifiers being compressed, and the determining of the subnet identifier from the index that stores the association between the subnet addresses and the subnet identifiers, including at least extracting the subnet identifier from the index that stores the association between the subnet addresses and the subnet identifiers while the index that stores the associations between the subnet addresses and the subnet identifiers is compressed.

Embodiment 9. A system comprising:

a processor system including one or more processors, and a memory system, the memory system storing one or more machine instructions, which when implement cause the processor system to implement a method including at least determining, by a machine of the system, whether a packet is from a location that meets one or more predetermined criteria, the one or more predetermined criteria being indicative of whether an acceptable connection quality is obtainable, the machine having a processor system including one or more processors and a memory system;

if the determining determines that at least one of the one or more predetermined criteria are not met, blocking by the machine, the packet; and if the determining determines that the one or more predetermined criteria are met, processing by the machine, the packet;

the determining of whether the one or more predetermined criteria are met including at least determining, by the machine, whether the packet originated from a location that is within a particular predefined vicinity, if the packet originated from within the particular predefined vicinity, at least one of the one or more predetermined criteria are met, and unless there is another of the one or more predetermined criteria that is not met, the packet is allowed to pass, by the machine; and if the packet originated from outside of the particular predefined vicinity, the one or more predetermined criteria are not met, and the packet is blocked by the machine;

the determining of whether the packet originated from the location that is within the particular predefined vicinity including at least determining a location associated with a subnet by at least determining, by the machine, a subnet identifier from an index that stores an association between the subnet addresses and subnet identifiers, and determining, by the machine, a location based on the subnet identifier from an index that stores an association of subnet identifiers with locations;

the index that stores the association between the subnet addresses and the subnet identifiers being compressed, and the determining of the subnet identifier from the index that stores the association between the subnet addresses and the subnet identifiers, including at least extracting the subnet identifier from the index that stores the association between the subnet addresses and the subnet identifiers while the index that stores the associations between the subnet addresses and the subnet identifiers is compressed.

Embodiment 10. A system comprising:

a processor system including one or more processors, and a memory system, the memory system storing one or more machine instructions, which when implement cause the processor system to implement a method including at least determining, by a machine, whether a packet is from a location that meets one or more predetermined criteria, the one or more predetermined criteria being indicative of whether an acceptable connection quality is obtainable, the machine having a processor system including one or more processors and a memory system;

if the determining determines that at least one of the one or more predetermined criteria are not met, blocking by the machine, the packet; and if the determining determines that the one or more predetermined criteria are met, processing by the machine, the packet;

the determining of whether the one or more predetermined criteria are met including at least determining, by the machine, whether the packet originated from a location that is within a particular predefined vicinity, if the packet originated from within the particular predefined vicinity, at least one of the one or more predetermined criteria are met, and unless there is another of the one or more predetermined criteria that is not met, the packet is allowed to pass, by the machine; and if the packet originated from outside of the particular predefined vicinity, the one or more predetermined criteria are not met, and the packet is blocked by the machine;

the determining of whether the packet originated from the location that is within the particular predefined vicinity including at least determining a location associated with a subnet by at least determining, by the machine, a subnet identifier from an index that stores an association between subnet addresses and subnet identifiers, and determining, by the machine, a location based on a subnet identifier from an index that stores an association of subnet identifiers with locations;

extracting the subnet identifier, the extracting of the subnet identifier including at least navigating the index that stores the association between a subnet addresses and the subnet identifiers, based on the subnet address, by at least computing, by the machine, a rank of a current node and computing a value associated with a next node, the computing of the value associated with the next node including at least computing, by the machine, twice the rank of the current node, if a node of interest is a first child of the current node, where twice the rank of the current node is the value associated with the next node and computing, by the machine, twice the rank of the current node plus one, if the node of interest is a second child of the current node, where twice the rank of the current node plus one is the value associated with the next node.

Embodiment 11. A system comprising:

a processor system including one or more processors, and a memory system, the memory system storing one or more machine instructions, which when implement cause the processor system to implement a method including at least determining, by a machine, whether a packet is from a location that meets one or more predetermined criteria, the one or more predetermined criteria being indicative of whether an acceptable connection quality is obtainable, the machine having a processor system including one or more processors and a memory system;

if the determining determines that at least one of the one or more predetermined criteria are not met, blocking by the machine, the packet; and if the determining determines that the one or more predetermined criteria are met, processing by the machine, the packet;

the determining of whether the one or more predetermined criteria are met including at least determining, by the machine, whether the packet originated from a location that is within a particular predefined vicinity, if the packet originated from within the particular predefined vicinity, at least one of the one or more predetermined criteria are met, and unless there is another of the one or more predetermined criteria is not met, the packet is allowed to pass, by the machine; and if the packet originated from outside of the particular predefined vicinity, the one or more predetermined criteria are not met, and the packet is blocked by the machine;

the determining of whether the packet originated from the location that is within the particular predefined vicinity including at least determining a location associated with a subnet by at least determining, by the machine, a subnet identifier from an index that stores an association between subnet addresses and subnet identifiers, and determining, by the machine, a location based on the subnet identifier from an index that stores an association of subnet identifiers with locations;

extracting the subnet identifier, the extracting of the subnet identifier including at least computing a rank of the node associated with the subnet; and determining a value of the subnet identifier based on the rank of the node associated with the subnet.

Embodiment 12. The system of any of embodiments 1-19 or 8, the method further comprising extracting the subnet identifier, the extracting including determining, by the machine, a sequence of bits that is associated with a word, the word being associated with the subnet, the determining being based on an identifier of the sequence of bits and a stored value representing how many bits are in the word that are set to a particular value.

Embodiment 13. A system comprising:

a processor system including one or more processors, and a memory system, the memory system storing one or more machine instructions, which when implement cause the processor system to implement a method including at least determining, by a machine, whether a packet is from a location that meets one or more predetermined criteria, the one or more predetermined criteria being indicative of whether an acceptable connection quality is obtainable, the machine having a processor system including one or more processors and a memory system; if the determining determines that at least one of the one or more predetermined criteria are not met, blocking, by the machine, the packet; and if the determining determines that the one or more predetermined criteria are met, processing by the machine, the packet;

the determining of whether the one or more predetermined criteria are met including at least determining, by the machine, whether the packet originated from a location that is within a particular predefined vicinity, if the packet originated from within the particular predefined vicinity, at least one of the one or more predetermined criteria are met, and unless there is another of the one or more predetermined criteria is not met, the packet is allowed to pass, by the machine; and if the packet originated from outside of the particular predefined vicinity, the one or more predetermined criteria are not met, and the packet is blocked by the machine;

the determining of whether the packet originated from the location that is within the particular predefined vicinity including at least determining a location associated with a subnet by at least determining, by the machine, a subnet identifier from an index that stores an association between subnet addresses and subnet identifiers, and determining, by the machine, a location based on the subnet identifier from an index that stores an association of subnet identifiers with locations;

extracting the subnet identifier, the extracting of the subnet identifier including at least determining, by the machine, a bucket corresponding to a node of interest, the node of interest being a node of a tree represented by the index that stores the association between the subnet addresses and the subnet identifiers;

retrieving, by the machine, a rank associated with the bucket;

determining, by the machine, a word within the bucket corresponding to the node of interest;

determining, by the machine, words within the bucket based on a start of the bucket and the word corresponding to the node of interest;

retrieving, by the machine, a popcount for each word from the start of the bucket until the word corresponding to the node of interest, the popcount being a count of all bits in the word that are set to a particular value;

determining, by the machine, how many bits are set to the particular value that (1) are in the word corresponding to the node of interest, and (2) are associated with bit locations starting at a beginning of the word and ending at a bit associated with the node of interest;

determining, by the machine, a sum of the rank associated with the bucket, the popcount of each word from the start of the bucket to the word associated with the node of interest, and the bits are set to the particular value that (1) are in the word corresponding to the node of interest, and (2) are associated with bit locations starting at a beginning of the word and ending at the bit associated with the node of interest.

Embodiment 14. A system comprising:

a processor system including one or more processors, and a memory system, the memory system storing one or more machine instructions, which when implement cause the processor system to implement a method including at least determining, by a machine, whether a packet is from a location that meets one or more predetermined criteria, the one or more predetermined criteria being indicative of whether an acceptable connection quality is obtainable, the machine having a processor system including one or more processors and a memory system;

if the determining determines that at least one of the one or more predetermined criteria are not met, blocking, by the machine, the packet; and if the determining determines that the one or more predetermined criteria are met, processing, by the machine, the packet;

the determining of whether the one or more predetermined criteria are met including at least determining, by the machine, whether the packet originated from a location that is within a particular predefined vicinity, if the packet originated from within the particular predefined vicinity, at least one of the one or more predetermined criteria are met, and unless there is another of the one or more predetermined criteria is not met, the packet is allowed to pass, by the machine; and if the packet originated from outside of the particular predefined vicinity, the one or more predetermined criteria are not met, and the packet is blocked by the machine;

the determining of whether the packet originated from the location that is within the particular predefined vicinity including at least determining a location associated with a subnet by at least determining, by the machine, a subnet identifier from an index that stores an association between subnet addresses and subnet identifiers, and determining, by the machine, a location based on the subnet identifier from an index that stores an association of subnet identifiers with locations;

the index that stores the association of subnet identifiers with locations being compressed, and the determining of the subnet identifier from the index that stores the association between the subnet identifiers and locations, including at least searching for the locations associated with the subnet identifiers in the index that stores the association of subnet identifiers with the locations, while the index that stores the association of subnet identifiers with the locations is compressed.

Embodiment 15. A system comprising:

a processor system including one or more processors, and a memory system, the memory system storing one or more machine instructions, which when implement cause the processor system to implement a method including at least determining, by a machine, whether a packet is from a location that meets one or more predetermined criteria, the one or more predetermined criteria being indicative of whether an acceptable connection quality is obtainable, the machine having a processor system including one or more processors and a memory system;

if the determining determines that at least one of the one or more predetermined criteria are not met, blocking, by the machine, the packet; and if the determining determines that the one or more predetermined criteria are met, processing, by the machine, the packet;

the determining of whether the one or more predetermined criteria are met including at least determining, by the machine, whether the packet originated from a location that is within a particular predefined vicinity, if the packet originated from within the particular predefined vicinity, at least one of the one or more predetermined criteria are met, and unless there is another of the one or more predetermined criteria is not met, the packet is allowed to pass, by the machine; and if the packet originated from outside of the particular predefined vicinity, the one or more predetermined criteria are not met, and the packet is blocked by the machine;

the determining of whether the packet originated from the location that is within the particular predefined vicinity including, at least, determining a location associated with a subnet by at least determining, by the machine, a subnet identifier from an index that stores an association between subnet addresses and subnet identifiers, and determining, by the machine, a location based on the subnet identifier from an index that stores an association of subnet identifiers with locations; and the index that stores the association of the subnet identifiers with the locations, having the locations encoded with bit sequences, where location coordinates that occur more frequently are encoded with bit shorter bit sequences than bit sequences representing location coordinates that occur less frequently, the method further including at least determining, by the machine, a bucket that stores information associated with a subnet identifier of interest by at least searching, by the machine, a collection of subnet identifiers characterizing buckets; and determining, by the machine, a location within the bucket by at least searching within the bucket for the subnet identifier of interest.

Embodiment 16. A system comprising:

a processor system including one or more processors, and a memory system, the memory system storing one or more machine instructions, which when implement cause the processor system to implement a method including at least determining, by a machine, whether a packet is from a location that meets one or more predetermined criteria, the one or more predetermined criteria being indicative of whether an acceptable connection quality is obtainable, the machine having a processor system including one or more processors and a memory system;

if the determining determines that at least one of the one or more predetermined criteria are not met, blocking, by the machine, the packet;

and if the determining determines that the one or more predetermined criteria are met, processing, by the machine, the packet;

if the packet originated from outside of the particular predefined vicinity, the one or more predetermined criteria are not met, and the packet is blocked by the machine;

the determining of whether the packet originated from the location that is within the particular predefined vicinity including at least the determining of the location including at least determining a location associated with a subnet by at least determining, by the machine, a location based on a subnet identifier from one or more indexes that store an association of subnet identifiers with location related information;

the one or more indexes that store the association of subnet identifiers with location related information being compressed, and the determining of location based on the subnet identifier from the one or more indexes that stores the association of the subnet identifiers with the location related information, including at least searching the one or more indexes while the one or more indexes are compressed.

Embodiment 17. The system of any of embodiments 1-19 or 1, wherein the determining of the location comprising determining a location associated with a subnet by at least determining, by the machine, a location based on a subnet identifier from one or more indexes that store an association of subnet identifiers with location related information.

Embodiment 18. The system of any of embodiments 1-19 or 1, wherein the determining of whether the packet is from a location being performed on a packet-by-packet basis.

Embodiment 19. The system of any of embodiments 1-19 or 1, wherein the determining of whether the packet is from a location being performed on packets from the same network, where some packets from that network are blocked and some packets from that network are allowed to pass, based on whether an acceptable connection quality is obtainable.

ALTERNATIVES AND EXTENSIONS

Throughout this specification the role of the 1s and 0s can be switched and/or substituted with any other pair of two values. In the succinct tree, if the is are used to represent the leafs, the rank of a node that is a leaf gives the leaf identifier and when navigating the succinct tree, LeftChild(m)=2(m-Rank(m)) and RightChild(m)=2(m-Rank(m))+1.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made, and equivalents may be substituted for elements thereof without departing from the true spirit and scope of the invention. In addition, modifications may be made without departing from the essential teachings of the invention.

The invention claimed is:

1. A system comprising:
a machine having
a processor system including one or more processors and
a memory system; the memory system storing one or more machine instructions, which when invoked by the one or more processors causes the processor to implement a method including at least,
determining by the machine whether a packet is from a location that meets one or more predetermined criteria, the one or more predetermined criteria being indicative of whether an acceptable connection quality is obtainable;
if the determining determines that the one or more predetermined criteria are not met, blocking by the machine, the packet; and
if the determining determines that the one or more predetermined criteria are met, processing by the machine, the packet;
the determining of whether the one or more predetermined criteria are met including at least determining, by the machine, whether the packet originated from a location that is within a particular predefined vicinity of a destination,
if the packet originated from within the particular predefined vicinity of the destination, at least one of the one or more predetermined criteria are met, and unless there is another of the one or more predetermined criteria that is not met, the packet is allowed to pass, by the machine; and
if the packet originated from outside of the particular predefined vicinity of the destination, the one or more predetermined criteria are not met, and the packet is blocked by the machine.

2. A system comprising:
a first machine having
a processor system including one or more processors and
a memory system;
the memory system storing one or more machine instructions, which when invoked by the one or more processors causes the processor system to implement a method including at least, hosting, by the first machine, a service;
searching, by a second machine, for a host that hosts the service;

determining by the first machine whether a packet, from the second machine, is from a location that meets one or more predetermined criteria, the one or more predetermined criteria being indicative of whether an acceptable connection quality is obtainable;

if the determining determines that the one or more predetermined criteria are not met, blocking by the first machine, the packet; and if the determining determines that the one or more predetermined criteria are met, processing by the first machine, the packet;

the determining of whether the one or more predetermined criteria are met including at least determining, by the first machine, whether the packet originated from a location that is within a particular predefined vicinity, if the packet originated from within the particular predefined vicinity, at least one of the one or more predetermined criteria are met, and therein unless there is another of the one or more predetermined criteria that is not met, the packet is allowed to pass, by the first machine; and if the packet originated from outside of the particular predefined vicinity, the one or more predetermined criteria are not met, and therein the packet is blocked by the first machine, as a result of the packet being blocked, the second machine ceasing to send packets to the first machine.

3. The system of claim 1, wherein the determining of whether the one or more predetermined criteria are met including at least determining whether, by the machine, a ping time is less than a given threshold;

if the ping time is less than the given threshold, at least one of the one or more predetermined criteria are met, and unless there is another of the one or more predetermined criteria are met, and therein unless there is another of the one or more predetermined criteria that is not met, the packet is allowed to pass, by the machine; and if the ping time is greater than the given threshold, at least one of the one or more predetermined criteria is not met, and therein the packet is blocked by the machine.

4. The system of claim 1, the machine being a router.

5. The system of claim 1, the machine being a server.

6. The system of claim 5, the server being a host of an online game.

7. The system of claim 1, the method further comprising:

preventing, by the machine, a user that is outside of the particular predefined vicinity from joining a game.

8. The system of claim 1, the determining of whether the packet originated from the location that is within the particular predefined vicinity including at least determining a location associated with a subnet by at least determining, by the machine, a subnet identifier from an index that stores an association between subnet addresses and subnet identifiers, and determining, by the machine, the location the packet originated from, based on (1) the subnet identifier from the index that stores the association of the subnet identifiers with locations associated with the subnet identifiers; and (2) the index that stores the association between the subnet addresses and the subnet identifiers being compressed, and the determining of the subnet identifier from the index that stores the association between the subnet addresses and the subnet identifiers, including at least extracting the subnet identifier from the index that stores the association between the subnet addresses and the subnet identifiers while the index that stores the associations between the subnet addresses and the subnet identifiers is compressed.

9. A system comprising:

a machine having a processor system including one or more processors and a memory system;

the memory system storing one or more machine instructions, which when invoked by the one or more processors causes the processor system to implement a method including at least, determining, by the machine, whether a packet is from a location that meets one or more predetermined criteria, the one or more predetermined criteria being indicative of whether an acceptable connection quality is obtainable;

if the determining determines that at least one of the one or more predetermined criteria are not met, blocking by the machine, the packet; and if the determining determines that the one or more predetermined criteria are met, processing by the machine, the packet;

the determining of whether the one or more predetermined criteria are met including at least determining, by the machine, whether the packet originated from a location that is within a particular predefined vicinity, if the packet originated from within the particular predefined vicinity, at least one of the one or more predetermined criteria are met, and therein unless there is another of the one or more predetermined criteria that is not met, the packet is allowed to pass, by the machine; and if the packet originated from outside of the particular predefined vicinity, the therein the one or more predetermined criteria are not met, and the packet is blocked by the machine;

the determining of whether the packet originated from the location that is within the particular predefined vicinity including at least determining a location associated with a subnet by at least determining, by the machine, a subnet identifier from an index that stores an association between subnet addresses and subnet identifiers, and determining, by the machine, a location based on the subnet identifier from the index that stores the association of the subnet identifiers with locations associated with the subnet identifiers; and the index that stores the association between the subnet addresses and the subnet identifiers being compressed, and the determining of the subnet identifier, from the index that stores the association between the subnet addresses and the subnet identifiers, including at least extracting the subnet identifier from the index that stores the association between the subnet addresses and the subnet identifiers while the index that stores the association between the subnet addresses and the subnet identifiers is compressed.

10. A system comprising:
a machine having
   a processor system including one or more processors and
   a memory system;
the memory system storing one or more machine instructions, which when invoked by the one or more processors causes the processor system to implement a method including at least,
   determining, by the machine, whether a packet is from a location that meets one or more predetermined criteria, the one or more predetermined criteria being indicative of whether an acceptable connection quality is obtainable;
   if the determining determines that at least one of the one or more predetermined criteria are not met, blocking by the machine, the packet; and
   if the determining determines that the one or more predetermined criteria are met, processing by the machine, the packet;
   the determining of whether the one or more predetermined criteria are met including at least determining, by the machine, whether the packet originated from a location that is within a particular predefined vicinity,
      if the packet originated from within the particular predefined vicinity, at least one of the one or more predetermined criteria are met, and therein unless there is another of the one or more predetermined criteria that is not met, the packet is allowed to pass, by the machine; and
      if the packet originated from outside of the particular predefined vicinity, the one or more predetermined criteria are not met, and therein the packet is blocked by the machine;
   the determining of whether the packet originated from the location that is within the particular predefined vicinity including at least determining a location associated with a subnet by at least
      determining, by the machine, a subnet identifier from an index that stores an association between subnet addresses and subnet identifiers, and determining, by the machine, a location based on the subnet identifier from the index that stores the association of the subnet identifiers with locations associated with the subnet identifiers;
      extracting the subnet identifier, the extracting of the subnet identifier including at least navigating the index that stores the association between the subnet addresses and the subnet identifiers, based on the subnet address, by at least computing, by the machine, a rank of a current node and computing a value associated with a next node, the computing of the value associated with the next node including at least
         computing, by the machine, twice the rank of the current node, if a node of interest is a first child of the current node, where twice the rank of the current node is the value associated with the next node and
         computing, by the machine, twice the rank of the current node plus one, if the node of interest is a second child of the current node, where twice the rank of the current node plus one is the value associated with the next node.

11. A system comprising:
a machine having
   a processor system including one or more processors and
   a memory system;
the memory system storing one or more machine instructions, which when invoked by the one or more processors causes the processor system to implement a method including at least,
   determining, by the machine, whether a packet is from a location that meets one or more predetermined criteria, the one or more predetermined criteria being indicative of whether an acceptable connection quality is obtainable;
   if the determining determines that at least one of the one or more predetermined criteria are not met, blocking by the machine, the packet; and
   if the determining determines that the one or more predetermined criteria are met, processing by the machine, the packet;
   the determining of whether the one or more predetermined criteria are met including at least determining, by the machine, whether the packet originated from a location that is within a particular predefined vicinity,
      if the packet originated from within the particular predefined vicinity, at least one of the one or more predetermined criteria are met, and therein unless there is another of the one or more predetermined criteria is not met, the packet is allowed to pass, by the machine; and
      if the packet originated from outside of the particular predefined vicinity, the one or more predetermined criteria are not met, and therein the packet is blocked by the machine;
   the determining of whether the packet originated from the location that is within the particular predefined vicinity including at least determining a location associated with a subnet by at least
      determining, by the machine, a subnet identifier from an index that stores an association between subnet addresses and subnet identifiers, and
      determining, by the machine, a location based on the subnet identifier from the index that stores the association of the subnet identifiers with locations associated with the subnet identifiers;
      the determining of the subnet identifier including at least
         extracting the subnet identifier, the extracting of the subnet identifier including at least computing a rank of a node associated with the subnet; and
         determining a value of the subnet identifier based on the rank of the node associated with the subnet.

12. The system of claim 8, the extracting including determining, by the machine, a sequence of bits that is associated with a word, the word being associated with the subnet, the determining being based on an identifier of the sequence of bits and a stored value representing how many bits are in the word that are set to a particular value.

13. A system comprising:
a machine having a processor system including
   one or more processors and
   a memory system;
the memory system storing one or more machine instructions, which when invoked by the one or more processors causes the processor system to implement a method including at least, determining, by the machine, whether a packet is from a location that meets one or more predetermined criteria, the one or more predetermined criteria being indicative of whether an acceptable connection quality is obtainable;
    if the determining determines that at least one of the one or more predetermined criteria are not met, blocking, by the machine, the packet; and
    if the determining determines that the one or more predetermined criteria are met, processing by the machine, the packet;
    the determining of whether the one or more predetermined criteria are met including at least determining, by the machine, whether the packet originated from a location that is within a particular predefined vicinity,
        if the packet originated from within the particular predefined vicinity, at least one of the one or more predetermined criteria are met, and therein unless there is another of the one or more predetermined criteria is not met, the packet is allowed to pass, by the machine; and
        if the packet originated from outside of the particular predefined vicinity, the one or more predetermined criteria are not met, and therein the packet is blocked by the machine;
    the determining of whether the packet originated from the location that is within the particular predefined vicinity including at least determining a location associated with a subnet by at least
        determining, by the machine, a subnet identifier from an index that stores an association between subnet addresses and subnet identifiers, and
        determining, by the machine, a location based on the subnet identifier from the index that stores the association of the subnet identifiers with a collection of locations;
        the determining of the subnet identifier including extracting the subnet identifier, the extracting of the subnet identifier including at least
            determining, by the machine, a bucket corresponding to a node of interest, the node of interest being a node of a tree represented by the index that stores the association between the subnet addresses and the subnet identifiers;
            retrieving, by the machine, a rank associated with the bucket;
            determining, by the machine, a word within the bucket corresponding to the node of interest;
            the determining of the word including determining, by the machine, words within the bucket based on a start of the bucket and the word corresponding to the node of interest;
            retrieving, by the machine, a popcount for each word from the start of the bucket until the word corresponding to the node of interest, the popcount being a count of all bits in the word that are set to a particular value;
    determining, by the machine, how many bits are set to the particular value that
        (1) are in the word corresponding to the node of interest, and
        (2) are associated with bit locations starting at a beginning of the word and ending at a bit associated with the node of interest;
    determining, by the machine, a sum of
        the rank associated with the bucket,
        the popcount of each word from the start of the bucket to the word associated with the node of interest, and
        the bits are set to the particular value that
            (1) are in the word corresponding to the node of interest, and
            (2) are associated with the bit locations starting at the beginning of the word and the ending at the bit associated with the node of interest.

14. A system comprising:
a machine having a processor system including
    one or more processors and
    a memory system;
the memory system storing one or more machine instructions, which when invoked by the one or more processors causes the processor system to implement a method including at least,
determining, by the machine, whether a packet is from a location that meets one or more predetermined criteria, the one or more predetermined criteria being indicative of whether an acceptable connection quality is obtainable;
    if the determining determines that at least one of the one or more predetermined criteria are not met, blocking, by the machine, the packet; and
    if the determining determines that the one or more predetermined criteria are met, processing, by the machine, the packet;
    the determining of whether the one or more predetermined criteria are met including at least determining, by the machine, whether the packet originated from a location that is within a particular predefined vicinity,
        if the packet originated from within the particular predefined vicinity, at least one of the one or more predetermined criteria are met, and therein unless there is another of the one or more predetermined criteria is not met, the packet is allowed to pass, by the machine; and
        if the packet originated from outside of the particular predefined vicinity, the one or more predetermined criteria are not met, and therein the packet is blocked by the machine;
    the determining of whether the packet originated from the location that is within the particular predefined vicinity including at least determining a location associated with a subnet by at least
        determining, by the machine, a subnet identifier from an index that stores an association between subnet addresses and subnet identifiers, and
        determining, by the machine, a location based on the subnet identifier from the index that stores the association of the subnet identifiers with locations associated with the subnet identifiers;
        the index that stores the association of the subnet identifiers with the locations associated with the subnet identifiers being compressed, and
        the determining of the subnet identifier from the index that stores the association between the subnet identifiers and the locations associated with the subnet identifiers, including at least searching for the locations associated with the subnet identifiers in the index that stores the association of the subnet identifiers with the locations associated with the subnet identifiers, while the index that stores the association of the subnet identifiers with the locations associated with the subnet identifiers is compressed.

15. A system comprising:
a machine having a processor system including
one or more processors and
a memory system;
the memory system storing one or more machine instructions, which when invoked by the one or more processors causes the processor system to implement a method including at least,
determining, by the machine, whether a packet is from a location that meets one or more predetermined criteria, the one or more predetermined criteria being indicative of whether an acceptable connection quality is obtainable;
if the determining determines that at least one of the one or more predetermined criteria are not met, blocking, by the machine, the packet;
if the determining determines that the one or more predetermined criteria are met, processing, by the machine, the packet;
the determining of whether the one or more predetermined criteria are met including at least determining, by the machine, whether the packet originated from a location that is within a particular predefined vicinity,
if the packet originated from within the particular predefined vicinity, at least one of the one or more predetermined criteria are met, and therein unless there is another of the one or more predetermined criteria is not met, the packet is allowed to pass, by the machine; and
if the packet originated from outside of the particular predefined vicinity, the one or more predetermined criteria are not met, and therein the packet is blocked by the machine;
the determining of whether the packet originated from the location that is within the particular predefined vicinity including, at least, determining a location associated with a subnet by at least
determining, by the machine, a subnet identifier from an index that stores an association between subnet addresses and subnet identifiers, and
determining, by the machine, the location that is within the particular predefined vicinity, based on the subnet identifier from the index that stores the association of the subnet identifiers with locations associated with the subnet identifiers; and
the index that stores the association of the subnet identifiers with the locations associated with the subnet identifiers, having the locations associated with the subnet identifiers encoded with bit sequences, where location coordinates that occur more frequently are encoded with shorter bit sequences than bit sequences representing location coordinates that occur less frequently, the method further including at least
determining, by the machine, a bucket that stores information associated with a subnet identifier of interest by at least searching, by the machine, a collection of subnet identifiers characterizing buckets; and
determining, by the machine, a location within the bucket by at least searching within the bucket for the subnet identifier of interest.

16. A system comprising:
a machine having a processor system including
one or more processors and
a memory system;
the memory system storing one or more machine instructions, which when invoked by the one or more processors causes the processor system to implement a method including at least,
determining, by the machine, whether a packet is from a location that meets one or more predetermined criteria, the one or more predetermined criteria being indicative of whether an acceptable connection quality is obtainable;
if the determining determines that at least one of the one or more predetermined criteria are not met, blocking, by the machine, the packet;
if the determining determines that the one or more predetermined criteria are met, processing, by the machine, the packet;
if the packet originated from outside of a particular predefined vicinity, the one or more predetermined criteria are not met, and therein the packet is blocked by the machine;
the determining of whether the packet originated from the location that is within the particular predefined vicinity including at least the determining of the location including at least determining a location associated with a subnet by at least
determining, by the machine, a location based on a subnet identifier from one or more indexes that store an association of subnet identifiers with location-related information;
the one or more indexes that store the association of the subnet identifiers with the location-related information being compressed, and
the determining of the location associated with the subnet, based on the subnet identifier from the one or more indexes that stores the association of the subnet identifiers with the location-related information, including at least searching the one or more indexes while the one or more indexes are compressed.

17. The system of claim 1, wherein the determining of the location comprising:
determining a location associated with a subnet by at least determining, by the machine, a location based on a subnet identifier from one or more indexes that store an association of subnet identifiers with location-related information.

18. The system of claim 1, wherein the determining of whether the packet is from the location that meets one or more predetermined criteria being performed on a packet-by-packet basis.

19. The system of claim 1, wherein the determining of whether the packet is from the location that meets one or more predetermined criteria being performed on packets from the same network, where some packets from the same network are blocked and some packets from the same network are allowed to pass, based on whether the acceptable connection quality is obtainable.

20. A system comprising:
a first machine having a processor system including
one or more processors and
a memory system;
the memory system storing one or more machine instructions, which when invoked by the one or more processors causes the processor to implement a method including at least, determining by the first machine whether a packet is from a location that meets one or more predetermined criteria, the one or more predetermined criteria being indicative of whether an acceptable connection quality is obtainable;
if the determining determines that the one or more predetermined criteria are not met, blocking by the first machine, the packet;
if the determining determines that the one or more predetermined criteria are met, processing by the first machine, the packet; and
as a result of blocking the packet, the first machine ceasing to receive packets from a second machine that sent the packet.

21. The system of claim 20, wherein the determining of whether the one or more predetermined criteria are met including at least determining, by the first machine, whether a hop count is less than a given threshold;
if the hop count is less than the given threshold, at least one of the one or more predetermined criteria are met, and therein unless there is another of the one or more predetermined criteria are met, and unless there is another of the one or more predetermined criteria is not met, the packet is allowed to pass, by the first machine; and
if the hop count is greater than the given threshold, at least of one or more predetermined criteria is not met, and the packet is blocked by the first machine.

22. The system of claim 20, wherein the determining of whether the one or more predetermined criteria are met including at least
determining whether, by the first machine, a ping time is less than a given threshold;
if the ping time is less than the given threshold,
at least one of the one or more predetermined criteria are met, and unless there is another of the one or more predetermined criteria are met, and unless there is another of the one or more predetermined criteria is not met, therein the packet is allowed to pass, by the first machine; and
if the ping time is greater than the given threshold, at least one of the one or more predetermined criteria is not met, and therein the packet is blocked by the first machine.

23. The system of claim 20, the first machine being a router.

24. The system of claim 20, the first machine being a server.

25. The system of claim 24, the server being a host of an online game.

26. The system of claim 20, wherein the method further comprises preventing, by the first machine, a user that is outside of a predefined vicinity from joining a game.

27. The system of claim 20, wherein blocking the packet includes not sending an acknowledgement of receipt of the packet.

28. The system of claim 20, wherein blocking the packet includes dropping the packet.

29. The system of claim 28, wherein the first machine communicates via a protocol in which a dropped packet is treated as a bad connection, therein causing the ceasing of receipt of the packet.

30. A system comprising:
a first machine having a processor system including one or more processors and a memory system;
the memory system storing one or more machine instructions, which when invoked by the one or more processors causes the processor to implement a method including at least,
determining by the first machine whether a packet is from a location that meets one or more predetermined criteria, the one or more predetermined criteria being indicative of whether an acceptable connection quality is obtainable;
if the determining determines that the one or more predetermined criteria are not met, blocking by the first machine, the packet;
if the determining determines that the one or more predetermined criteria are met, processing by the first machine, the packet; and
as a result of blocking the packet, the first machine ceasing to receive packets from a second machine that sent the packet;
wherein the determining of whether the one or more predetermined criteria are met including at least determining whether, by the first machine, a ping time is less than a given threshold;
if the ping time is less than the given threshold, at least one of the one or more predetermined criteria are met, and therein unless there is another of the one or more predetermined criteria are met, and unless there is another of the one or more predetermined criteria is not met, the packet is allowed to pass, by the first machine; and
if the ping time is greater than the given threshold, at least of one or more predetermined criteria is not met, and therein the packet is blocked by the first machine.

31. A system comprising:
a first machine having
a processor system including one or more processors and
a memory system;
the memory system storing one or more machine instructions, which when invoked by the one or more processors causes the processor to implement a method including at least,
determining by the first machine whether a message is from a location that meets one or more predetermined criteria, the one or more predetermined criteria being indicative of whether an acceptable connection quality is obtainable;
if the determining determines that the one or more predetermined criteria are not met, blocking by the first machine, the message;
if the determining determines that the one or more predetermined criteria are met, processing by the first machine, the message; and
as a result of blocking the message, the first machine ceasing to receive the message from a second machine that sent the message.

32. The system of claim 31, wherein blocking the message includes dropping the message.

33. The system of claim 32, wherein the first machine communicates via a protocol in which a dropped packet is treated as a bad connection, therein causing the ceasing of receipt of further packets.

\* \* \* \* \*